United States Patent [19]
Arbuckle

[11] Patent Number: 5,906,374
[45] Date of Patent: May 25, 1999

[54] DUAL SEAL BARRIER FLUID LEAKAGE CONTROL METHOD UTILIZING LINEARLY DISPLACEABLE MEMBER

[76] Inventor: Donald P. Arbuckle, 4483 S. Vrain, Denver, Colo. 80236

[21] Appl. No.: 08/909,458

[22] Filed: Aug. 11, 1997

Related U.S. Application Data

[63] Continuation of application No. 08/773,440, Dec. 27, 1996, Pat. No. 5,746,435, which is a continuation of application No. 08/315,821, Sep. 30, 1994, abandoned.

[51] Int. Cl.$^6$ .................................................. F16J 9/00
[52] U.S. Cl. .......................... 277/304; 277/320; 277/361
[58] Field of Search .................................. 277/304, 306, 277/318, 320, 346, 352, 361

[56] References Cited

U.S. PATENT DOCUMENTS

| | | | |
|---|---|---|---|
| 3,176,996 | 4/1965 | Barnett | 277/2 |
| 3,259,390 | 7/1966 | Sanford | 277/3 |
| 3,297,329 | 1/1967 | Smith et al. | 277/3 |
| 3,589,737 | 6/1971 | Sedy | 277/17 |
| 3,749,411 | 7/1973 | Lennon | 277/2 |
| 3,831,381 | 8/1974 | Swearingen | 60/657 |
| 3,887,195 | 6/1975 | Vinciguerra | 277/2 |
| 3,888,495 | 6/1975 | Mayer | 277/3 |
| 3,987,663 | 10/1976 | Repella | 73/46 |
| 3,994,503 | 11/1976 | Dousse et al. | 277/3 |
| 4,014,555 | 3/1977 | Jacottet | 277/3 |
| 4,114,058 | 9/1978 | Albaric | 310/54 |
| 4,206,928 | 6/1980 | Asano | 277/15 |
| 4,408,766 | 10/1983 | Paech | 277/3 |
| 4,505,115 | 3/1985 | Arbuckle | 60/562 |
| 4,510,792 | 4/1985 | Morel et al. | 73/40.7 |
| 4,858,937 | 8/1989 | Fairlie-Clarke et al. | 277/2 |
| 4,922,719 | 5/1990 | Arbuckle | 60/562 |
| 5,031,509 | 7/1991 | Cowan | 92/86 |
| 5,067,874 | 11/1991 | Focte | 415/230 |
| 5,186,277 | 2/1993 | Snuttjer et al. | 184/6.22 |
| 5,209,495 | 5/1993 | Palmour | 277/3 |
| 5,244,183 | 9/1993 | Calvin et al. | 251/214 |
| 5,249,812 | 10/1993 | Volden et al. | 277/15 |
| 5,267,736 | 12/1993 | Pietsch et al. | 277/1 |
| 5,345,829 | 9/1994 | Yamauchi et al. | 73/865.9 |
| 5,502,435 | 3/1996 | Ralston | 340/632 |
| 5,535,136 | 7/1996 | Standifer | 364/510 |

*Primary Examiner*—Daniel G. DePumpo
*Attorney, Agent, or Firm*—Flanagan & Flanagan; John R. Flanagan; John K. Flanagan

[57] ABSTRACT

A method for controlling leakage of a barrier fluid from a dual seal assembly of equipment, such as a pump or valve, employs a barrier fluid supply arrangement connected to a barrier fluid chamber of the dual seal assembly, a pressure intensifier mechanism coupled to a process fluid chamber and the barrier fluid chamber of the dual seal assembly and being operable to maintain the pressure of the barrier fluid at a preset level above the pressure of the process fluid in response to the absence of barrier fluid leakage from the dual seal assembly, and a pressure monitoring and control arrangement coupled to the barrier fluid supply arrangement and the pressure intensifier mechanism and being operable to detect and measure the decrease of the barrier fluid pressure below the preset level and to compensate therefor by actuating the barrier fluid supply arrangement to supply barrier fluid to the barrier fluid chamber until the barrier fluid pressure has increased above the preset level. The pressure monitoring and control arrangement is also operable to calculate and provide a readout of both the average and instantaneous leakage rate.

23 Claims, 13 Drawing Sheets

FIG. 13

DUAL SEAL BARRIER FLUID LEAKAGE CONTROL METHOD UTILIZING LINEARLY DISPLACEABLE MEMBER

This application is a continuation of patent application Ser. No. 08/773,440, filed Dec. 27, 1996, now U.S. Pat. No. 5,746,435 which is a continuation of patent application Ser. No. 08/315,821, filed Sep. 30, 1994, now abandoned.

BACKGROUND OF THE INVENTION

1. Field of the Invention

The present invention generally relates to techniques for controlling emissions from dual seals of a variety of types of equipment, such as pumps, valves, compressors, turbines, agitators, centrifuges, mixers and generators, and, more particularly, is concerned with a method for controlling barrier fluid (liquid or gas) leakage from a dual seal so as to maintain a proper level of barrier fluid pressure in the dual seal.

2. Description of the Prior Art

In the past few years the Environmental Protection Agency (EPA) of the U.S. Government has developed new regulations pertaining to emissions of volatile organic compounds (VOCs). The focus of these new regulations is the atmospheric emission of VOCs from chemical and petroleum processing equipment. Many VOCs change phase from a liquid to a gas and become airborne pollutants when leaked from processing equipment. Leakage of VOCs from valves, fittings and mechanical pump seals (the three primary sources of VOC emissions) is referred to as "fugitive" emissions.

Engineers from the chemical and petroleum process industry, along with representatives from the EPA, have worked jointly to develop design guidelines for mechanical seals to control fugitive emissions. One such guideline requires the use of dual mechanical seals with a pressurized non-volatile benign barrier fluid between the seals. Pressurization of the barrier fluid is regulated to ensure a correct pressure range relative to the pumpage fluid pressure, and the system is monitored to detect leakage from the seals.

Current pressurized barrier seal designs, although effective, require support equipment that must be adjusted, carefully monitored and maintained. In addition, there is not a system available which quantitatively measures the leakage of pumpage or barrier fluid.

Consequently, a need exists for an effective fugitive emissions sealing system in which barrier fluid leakage is measured and compensated so that its proper pressurization is maintained.

SUMMARY OF THE INVENTION

The present invention provides a dual seal barrier fluid leakage control method designed to satisfy the aforementioned need. The fluid leakage control method of the present invention controls barrier fluid leakage from a dual seal by measuring the amount of barrier fluid leakage and compensating for the amount of barrier fluid leakage measured so as to maintain a proper volume of barrier fluid pressure in the dual seal. It should be noted that the barrier fluid can be a gas or a liquid, depending upon the particular application.

The fluid leakage control method of the present invention thus overcomes the problems of dual seals, particularly as employed in the fluid handling equipment of the chemical and petroleum industry where control of fugitive emissions has been identified as an important environmental issue.

Also, the fluid leakage control method of the present invention requires little or no periodic maintenance or adjustment, and automatically compensates the barrier fluid pressure with changes in process fluid pressure. Furthermore, quantitative monitoring and measurement of seal leakage is made easy and inexpensive by the fluid leakage control method of the present invention. Such quantitative monitoring and measurement of barrier fluid leakage facilitates the evaluation of when the dual seals should be serviced or replaced.

Accordingly, the present invention is directed to an method for controlling leakage of a barrier fluid from a dual seal assembly in fluid handling equipment so as to maintain the barrier fluid at a preset level of pressure above the pressure of process fluid in the equipment. The dual seal assembly includes a process fluid chamber containing pressurized process fluid, a barrier fluid chamber containing pressurized barrier fluid, a primary seal between the process fluid chamber and barrier fluid chamber, and a secondary seal between the barrier fluid chamber and the external atmosphere.

The leakage controlling method comprises the steps of: (a) maintaining the pressure of the barrier fluid in the barrier fluid chamber at a preset pressure level above the pressure of the process fluid in the process fluid chamber in response to the absence of barrier fluid leakage from the dual seal assembly; (b) providing a member capable of movement through a linear displacement in response to and directly proportional to a change in volume of barrier fluid in the barrier fluid chamber; (c) measuring the linear displacement of the member to calculate the current position of the member; (d) comparing the calculated current position of the member to maximum and minimum stored positions thereof; (e) in response to the comparing, providing an indication of whether there is leakage of the barrier fluid from the barrier fluid chamber; and (f) in response to an indication of leakage of the barrier fluid from the barrier fluid chamber, actuating the supplying of barrier fluid to the barrier fluid chamber and calculating a rate of the leakage of the barrier fluid.

More particularly, the step of maintaining of the barrier fluid pressure is accomplished by connecting first and second opposite end portions of an elongated hollow cylinder of a pressure intensifier mechanism respectively in pressure-sensitive communication with the process fluid chamber and barrier fluid chamber, reciprocally mounting a piston member in the hollow cylinder having a first end of the piston member in pressure-sensitive communication with the pressurized process fluid at the first end portion of the hollow cylinder and a second end of the piston member in pressure-sensitive communication with the pressurized barrier fluid at the second end portion of the hollow cylinder, and attaching to and extending from the second end of the piston and through the second end portion of the hollow cylinder an elongated rod which constitutes the linearly displaceable member, the first end of said piston member being larger in surface area than the second end thereof, due to the presence of the elongated rod at the second end of the piston, in a predetermined ratio that increases the barrier fluid pressure to and maintains the barrier fluid pressure at the predetermined pressure level above the pressure of the process fluid in response to the absence of barrier fluid leakage from the dual seal assembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 13 is a fragmentary diagrammatic view of another modified form of the modified third embodiment of the control apparatus of FIG. 10.

DETAILED DESCRIPTION OF THE INVENTION

Figure 1:
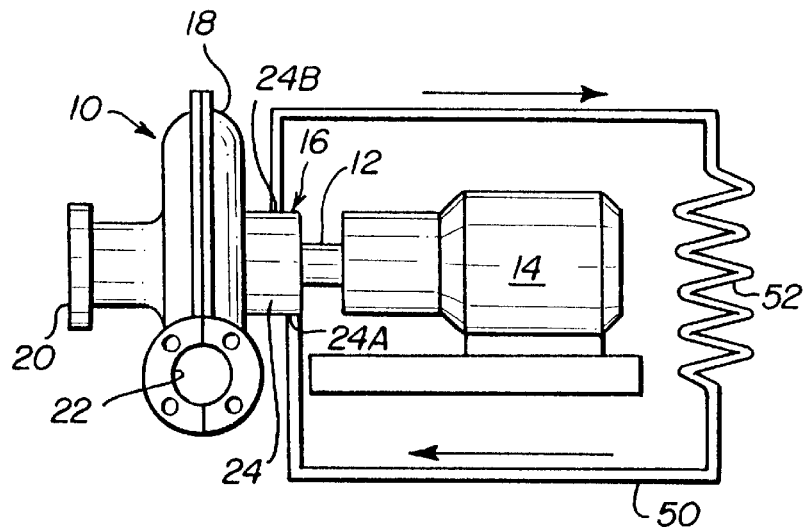
FIG. 1 is an elevational view of a prior art pump driven by a motor and employing a prior art dual mechanical pump seal assembly to prevent leakage of fluid from the pump to the external environment.

Referring to the drawings and particularly to FIG. 1, there is illustrated fluid handling equipment such as a prior art pump 10 having a central rotary drive shaft 12 coupled to and driven by a pump motor 14 and employing a prior art seal assembly 16 adapted to prevent leakage of environmentally-hazardous pumpage fluid along the rotary drive shaft 12 from the pump 10 to the external environment. The pump 10 has a housing 18 and an impeller (not shown) disposed within the housing 18. The impeller is attached on the rotary shaft 12 to undergo rotation therewith to pump the pumpage fluid, received into the housing 18 through an axial inlet port 20, from the housing 18 through a tangential discharge port 22. The seal assembly 16 is attached to one axial end of the pump housing 18 and disposed along the rotary drive shaft 12 between the pump housing 18 and the pump motor 14.

Figure 2:
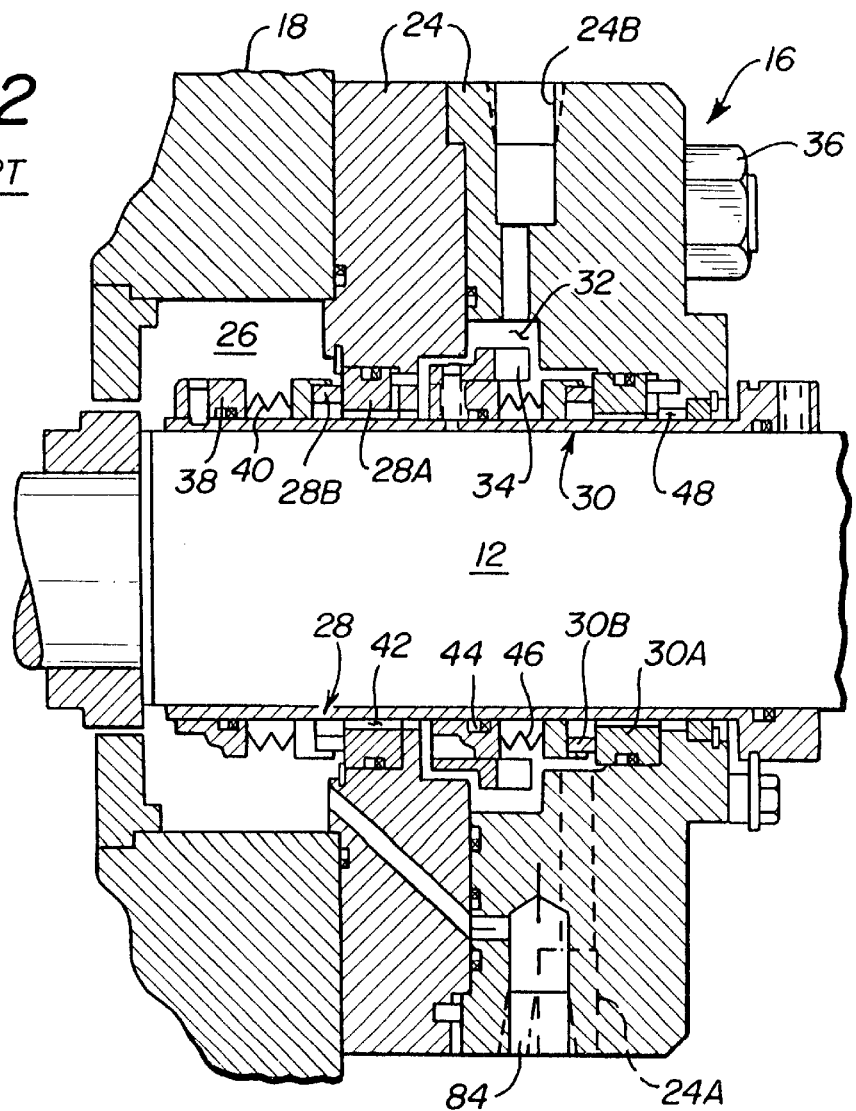
FIG. 2 is a longitudinal axial sectional view of the prior art dual mechanical pump seal assembly employed by the pump of FIG. 1.

Referring to FIG. 2, by way of example, the seal assembly 16 shown is a dual mechanical seal type. The dual seal assembly 16 basically includes a seal housing 24, a pumpage fluid chamber 26, a primary pump seal 28, a secondary pump seal 30, a barrier fluid chamber 32 and a secondary seal impeller 34. The seal housing 24 is disposed about the rotary drive shaft 12 and attached by a plurality of bolts 36 (only one shown) to the one axial end of the pump housing 18. The seal housing 24 in conjunction with the pump housing 18 defines the pumpage fluid chamber 26 which contains the pumpage fluid under a pressure substantially near the operating pressure of the pump 10.

The primary pump seal 28 of the dual seal assembly 16 is disposed about the rotary drive shaft 12 proximate to the region of mating between the pump housing 18 and seal housing 24. The primary pump seal 28 includes an annular stationary seal member 28A disposed about the rotary drive shaft 12 and fixedly mounted to the seal housing 24 and an annular rotary seal member 28B disposed about the rotary drive shaft 12 within the pumpage fluid chamber 26 and mounted to the rotary drive shaft 12 for rotation therewith and axially slidable movement therealong. Attachment means in the form of a collar 38 fixedly attached to the rotary drive shaft 12 and a spring 40 disposed between the collar 38 and rotary seal member 28B mount the rotary seal member 28B to the rotary drive shaft 12 and also bias the rotary seal member 28B toward and into a sealing relationship with the stationary seal member 28A. The primary pump seal 28 at one side communicates with the pumpage fluid chamber 26 and at an opposite side communicates with an annular passageway 42 defined in the seal housing 24 which leads from the primary pump seal 28 to the barrier fluid chamber 32.

The secondary pump seal 30 is disposed about the rotary drive shaft 12 within the barrier fluid chamber 32 and is axially spaced from the primary pump seal 28. The secondary pump seal 30 includes an annular stationary seal member 30A disposed about the rotary drive shaft 12 and fixedly mounted to the seal housing 24 and an annular rotary seal member 30B disposed about the rotary drive shaft 12 within the barrier fluid chamber 32 and mounted to the rotary drive shaft 12 for rotation therewith and axially slidable movement therealong. Attachment means in the form of another collar 44 fixedly attached to the rotary drive shaft 12 and another spring 46 disposed between the collar 44 and rotary seal member 30B mount the rotary seal member 30B to the rotary drive shaft 12 and also bias the rotary seal member 30B toward and into a sealing relationship with the stationary seal member 30A. The secondary pump seal 30 at one side communicates with the barrier fluid chamber 32 and at an opposite side communicates with an annular passageway 48 defined in the seal housing 24 which leads from the secondary pump seal 30 to the exterior of the dual seal assembly 16 and to the atmosphere.

The barrier fluid chamber 32 is generally annular in shape and so is defined about the rotary drive shaft 12 within the seal housing 24 between and in communication with the primary and secondary pump seals 28, 30. The secondary seal impeller 34 is attached to the collar 44 and so rotates with the rotary drive shaft 12, acting as an auxiliary pump and causing the barrier fluid to flow through the barrier fluid chamber 32 and about a recirculation circuit 50 connected to the seal housing 24 via inlet and outlet ports 24A, 24B. The barrier fluid flows in the recirculation circuit 50 in the direction of arrows A shown in FIG. 1. The barrier fluid picks up and carries away some of the heat generated by the primary and secondary pump seals 28, 30. The heat-bearing barrier fluid flows through a heat exchanger 52 interposed in the recirculation circuit 50 which receives the transfer of heat from the barrier fluid and thereby cools the barrier fluid and the primary and secondary pump seals 28, 30 as well.

In order for the above-described dual seal assembly 16 to perform satisfactorily and prevent leakage of pumpage fluid into the barrier fluid chamber 32 and therefrom to the external atmosphere, the pressure of the barrier fluid must remain a desired amount, for example 10%, above the pressure of the pumpage fluid. Pumpage fluid leakage problems therefore arise when the pumpage fluid pressure increases and nears or even exceeds the barrier fluid pressure due to changes in processing conditions or pump speed, or when the barrier fluid leaks due to the high differential pressure across the secondary pump seal that seals the barrier fluid from the external atmosphere.

Figure 3:
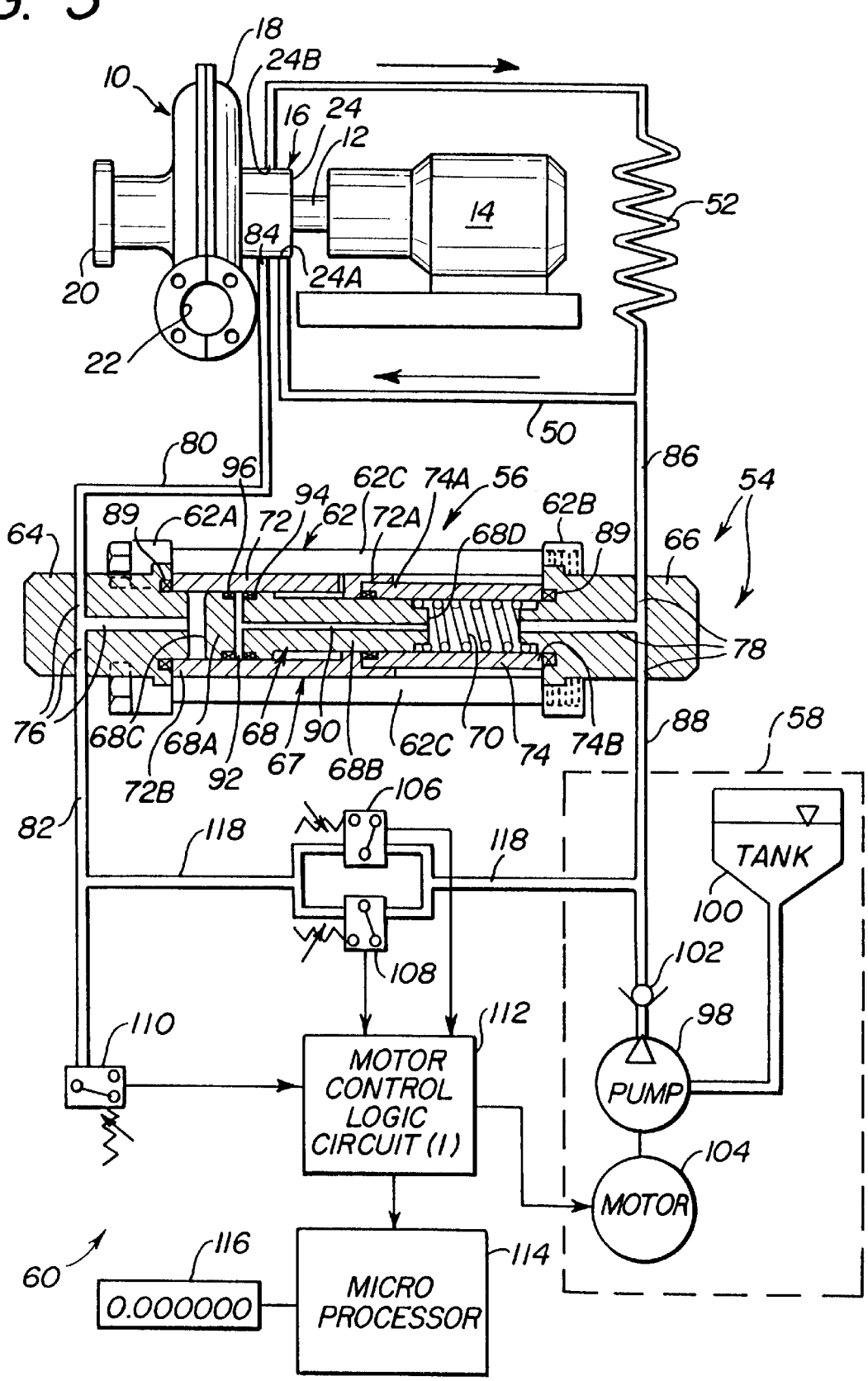
FIG. 3 is a diagrammatic view of a first embodiment of a dual mechanical seal barrier fluid leakage control apparatus which operates in accordance with the method of the present invention connected with the dual mechanical pump seal assembly of FIG. 1.

Referring to FIG. 3, there is illustrated a first embodiment of the dual seal barrier fluid leakage control apparatus 54 which operates in accordance with the method of the present invention, the aforementioned problems of the prior art dual seal assembly 16. The barrier fluid leakage control apparatus 54 integrates a pressure intensifier mechanism 56, a barrier fluid supply arrangement 58 and a pressure monitoring and control arrangement 60, with the dual seal assembly 16. Such integration maintains the pressure of the barrier fluid in the barrier fluid chamber 32 at the desired level greater than the pressure of the pumpage fluid in the pumpage fluid chamber 26. Such integration also supplies barrier fluid to the dual seal assembly 16, as needed, to compensate leakage, and calculates the barrier fluid leakage rates in order to provide vital information that is useful for scheduling pump seal maintenance. It is important to note that the leakage control apparatus, in the first embodiment as well as the other embodiments of the present invention, is not limited to fugitive emissions as defined by the EPA, nor limited to dual mechanical seals. The term "mechanical" seal is a special term for a rotating face seal used for pumps. The seal barrier fluid leakage control apparatus of the present invention can be used for any type of dual seal on any type of equipment that uses a barrier fluid. Also, the term "pumpage" fluid is used herein since the equipment being referred in the illustrated example of the application of the present invention is a pump. When reference is made to other types of equipment, the term "process" fluid would be used. Thus, as used herein, the term "pumpage" fluid is also meant to represent other "process" fluids.

The pressure intensifier mechanism 56 of the control apparatus 54 includes a mounting assembly 62 having a pair of first and second opposite end caps 62A, 62B and a plurality of elongated bolts 62C extending between and interconnecting the end caps 62A, 62B. The pressure intensifier mechanism 56 also includes a pair of first and second solid opposite end bodies or manifolds 64, 66 secured by the mounting assembly 62 at opposite ends of a hollow tubular body 67, an elongated piston 68 reciprocally mounted in the hollow tubular body 67, and means in the form of a resilient compressible spring 70 disposed in the hollow tubular body 67 between the piston 68 and the first end manifold 64. The hollow tubular body 67 is formed by a pair of large and small diameter hollow cylinders 72, 74 being disposed in tandem relationship along a common central axis. The large and small cylinders 72, 74 are open at respective inner ends 72A, 74A disposed adjacent to one another and at respective outer ends 72B, 74B disposed remote from one another.

The first and second solid opposite end manifolds 64, 66 have respective ports 76, 78 defined therethrough connected respectively in flow communication with the open outer ends 72B, 74B of the large and small cylinders 72, 74. The port 76 is also connected by flow lines 80, 82 in flow communication respectively with the pressure monitoring and control arrangement 60 and an orifice 84 defined in the seal housing 24 to lead to the pumpage fluid chamber 26 and provide communication of the pumpage fluid with the pressure intensifier mechanism 56. The port 78 is also connected by flow lines 86, 88 in flow communication respectively with the barrier fluid circuit 50 and the barrier fluid supply arrangement 58. Therefore, pumpage fluid pressure is communicated to the open outer end 72B of the large cylinder 72 of the pressure intensifier mechanism 56, while barrier fluid pressure is communicated to the open outer end 74B of the small cylinder 74 of the pressure intensifier mechanism 56.

The elongated piston 68 reciprocally mounted in the large and small cylinders 72, 74 has a large diameter body portion 68A disposed in the large diameter cylinder 72 and a small diameter body portion 68B disposed in the small diameter cylinder 74 and in tandem relation with the large diameter body portion 68A. The piston 68 also has opposite ends 68C, 68D of large and small surface areas on the respective large and small diameter body portions 68A, 68B and disposed adjacent to the respective first and second end manifolds 64, 66.

The pumpage fluid communicates through the port 76 of the first end manifold 64 into the outer open end 72B of the large cylinder 72 and into contact with the large surface area end 68C of the large diameter body portion 68A of the piston 68. The pressure of the pumpage fluid acts upon the large surface area end 68C of the piston 68, forcing the piston 68 to move toward the second end manifold 66, compressing the barrier fluid and thereby intensifying, or increasing, the barrier fluid pressure to a predetermined higher pressure at the small surface area end 68D of the small diameter body portion 68B of the piston 68 in contact with the barrier fluid. The difference in, or ratio of, the surface areas of the opposite ends 68C, 68D of the piston 68 is predetermined so as to increase the pressure of the barrier fluid to and thereby maintain the pressure of the barrier fluid at a preset level, such as 10%, above the pressure of the pumpage fluid. Thus, for example, if the pumpage fluid pressure is 500 psi, then the barrier fluid pressure would be maintained at 550 psi. When the pumpage fluid changes pressure due to the conditions previously noted, the pressure of the barrier fluid changes accordingly. If, for example, the pumpage fluid changes to a pressure of 700 psi, then the barrier fluid pressure will increase to 770 psi. The pressure intensifier mechanism 56 will maintain the barrier fluid pressure at a preset pressure level, for example 10%, above that of the pumpage fluid.

It should be noted that seals 89 are provided in the first and second opposite end manifolds 64, 66 to prevent leakage of pumpage and barrier fluids. A small bore 90 is defined through the center of the piston 68. The small bore 90 transfers barrier fluid from the small diameter cylinder 74 to a lantern ring 92 which separates a pair of annular seals 94, 96 that seal the pumpage fluid on the large diameter body portion 68B of the piston 68, creating a seal barrier for the pumpage fluid.

The spring 70 of the pressure intensifier mechanism 56 located in the small diameter cylinder 74 positions the piston 68 toward the left ends of both large and small diameter cylinders 72, 74, as viewed in FIG. 3. The piston 68 will move toward the right ends thereof as a result of barrier fluid leakage from the primary and secondary pump seals 28, 30. Pressure in the small diameter cylinder 74 is decreased or reduced by the compression of the spring 70 acting against the force of the piston 68. The more the piston 68 is moved toward the right ends of the cylinders 72, 74 the greater the counteracting spring force on the piston 68 and the greater the decrease in the pressure of the barrier fluid in the small diameter cylinder 74. The decrease in the pressure of the compressed barrier fluid is proportional to the amount of the barrier fluid leakage.

The pressure monitoring and control arrangement 60 detects and measures the barrier fluid pressure relative to the pumpage fluid pressure and together with the barrier fluid supply arrangement 58 compensate for any barrier fluid leakage so as to maintain the barrier fluid pressure at the preset level higher, such as about 10% higher, than the pumpage fluid pressure. The barrier fluid supply arrangement 58 includes a pump 98 connected in flow communication between a barrier fluid reservoir or tank 100 and the flow line 88 via a one-way check valve 102 connected to the barrier fluid side of the pressure intensifier mechanism 56 and to the circuit 50 via the flow line 86. The supply arrangement 58 also includes a motor 104 drivingly coupled to the pump 98. Operation of the motor 104 drives the pump 98 to inject barrier fluid under pressure from the tank 100 through the one-way check valve 102 toward the circuit 50 which increases the volume of barrier fluid in the circuit 50. Injection of barrier fluid from the supply arrangement 58 is controlled by an electrical input to the motor 104 from the pressure monitoring and control arrangement 60.

Before describing the operation of the pressure monitoring and control arrangement 60, consider first what happens when barrier fluid leaks from the dual seal assembly 16. Since the barrier fluid pressure is always higher than the pumpage fluid pressure, barrier fluid leaks into the pumpage fluid from across the primary pump seal 28. However, because of the high differential seal pressure, leakage is more likely across the secondary pump seal 30 that seals the barrier fluid from the external environmental atmosphere. Barrier fluid a leakage across the primary or secondary pump seals causes a change in volume which is compensated for by the movement of the intensifier mechanism piston 68 toward the right and also by compression of the spring 70 in the small diameter cylinder 74. The spring 70 compression will decrease or reduce the barrier fluid pressure to less than the desired 110% of the pumpage fluid pressure.

For detecting and measuring barrier fluid leakage and ultimately compensating for its lost volume, the pressure monitoring and control arrangement 60 includes a pair of differential pressure switches 106, 108, a pressure switch 110, a motor control logic circuit (MCLC(1)) 112, a microprocessor 114 and a digital display 116. The one differential pressure switch 106 is set to activate at a preset high pressure and the other differential pressure switch 108 is set to activate at a preset low pressure. The two differential pressure switches 106, 108 are disposed in parallel with the pressure intensifier mechanism 56 and in parallel with one another in a flow line 118 which extends between and connects with the respective flow lines 82, 88 so as to sense the pressures of the pumpage and barrier fluids at the respective opposite sides of the differential pressure switches 106, 108. The pressure switch 110 is connected by the flow line 82 to pumpage fluid side of the pressure intensifier mechanism 56.

The outputs from the pressure switches 106, 108, 110 are connected to the MCLC(1) 112 as inputs. The MCLC(1) 112 is a digital logic or latching relay circuit that performs the following control functions:

(1) The pressure switch 110 connected to the pumpage fluid side of the intensifier mechanism 56 is checked for low pressure, which indicates that the pump 10 is not operating. If the pressure is low, output from the MCLC(1) 112 is disabled.

(2) If the pressure from the pressure switch 110 is high, indicating that the pump 10 is operating, then the low pressure differential switch 108 is checked.

(3) If the low pressure differential switch 108 is "on", the piston 68 of the intensifier mechanism 56 has moved to the far right therein, dropping the barrier fluid pressure to just above the pumpage fluid pressure. The "on" condition of the low pressure differential switch 108 activates the MCLC(1) 112 to cause operation of the motor 104 and which, in turns, operates the pump 98 of the barrier fluid supply arrangement 58. Operation of the pump 98 injects barrier fluid into the circuit 50 and barrier fluid chamber 32 until the high pressure differential pressure switch 106 turns "on", indicating that the piston 68 of the intensifier mechanism 56 has moved to the far left end thereof. When the latter occurs, the high pressure differential switch 108 activates the MCLC(1) 112 to cause termination of the operation of the motor 104 and pump 98, ceasing the injection of more barrier fluid into the circuit 50. This process of barrier fluid injection occurs each time a single intensifier piston stroke (volume) of barrier fluid is leaked.

Each time the barrier fluid supply arrangement 56 is activated in the manner described above, an output signal is sent to the microprocessor 114 which records the event date and time. Consecutive dates and times are subtracted from one another to determine the time from the last injection of barrier fluid. The time calculated is divided into the known volume of barrier fluid for a single stroke of the intensifier mechanism piston 68. The resulting calculation is an average leakage rate displayed on the digital display 116.

Figure 4:
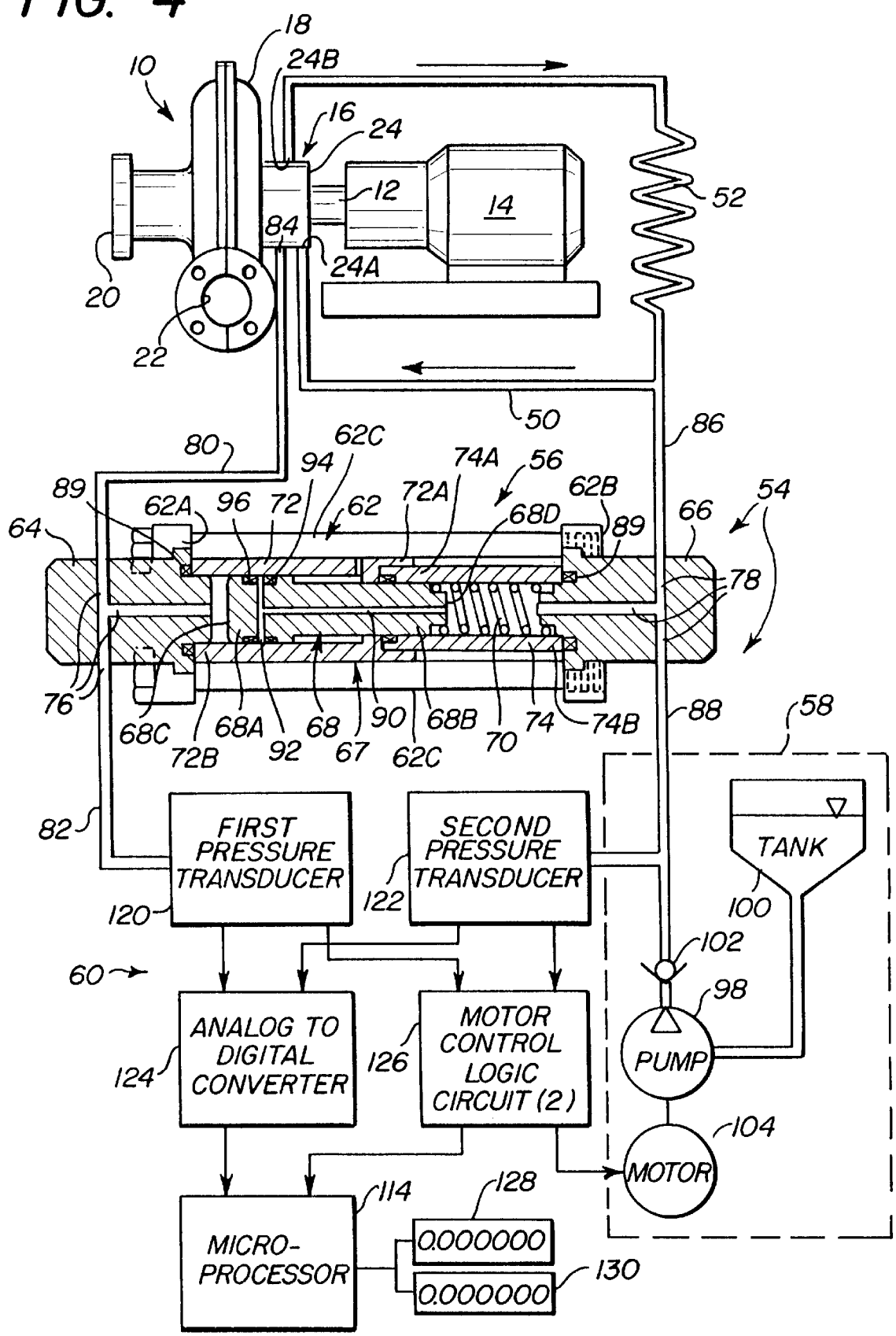
FIG. 4 is a diagrammatic view of a second embodiment of the dual mechanical seal barrier fluid leakage control apparatus which operates in accordance with the method of the present invention.

Referring to FIG. 4, there is illustrated a second embodiment of the barrier fluid leakage control apparatus 54 which operates in accordance with the method of the present invention differing from the first embodiment thereof of FIG. 3 only in the pressure monitoring and control arrangement 60 and the method of calculating the leakage rate. The average leakage rate calculations as described above with respect to the first embodiment of the barrier fluid leakage control apparatus 54 of FIG. 3 can require long periods of time before an updated leakage calculation takes place. The long period may provide misleading information about the pump seal status, particularly if he leakage rate is increasing over time. An improved approach is taken by the second embodiment of the barrier fluid leakage control apparatus 54 of FIG. 4 herein an instantaneous and an average leakage rate for the pump seals are calculated.

The pressure monitoring and control arrangement 60 of the second embodiment of the barrier fluid leakage control apparatus 54 includes a pair of first and second pressure transducers 120, 122 respectively connected to the flow lines 82, 88 and thus to respective pumpage fluid and barrier fluid sides of the pressure intensifier mechanism 56. A d.c. voltage proportional to pressure is generated as the outputs from the first and second pressure transducers 120, 122. Two outputs are generated from each pressure transducer 120, 122 and are connected as inputs to an analog-to-digital (A/D) converter 124 and another motor control logic circuit (MCLC (2)) 126. The MCLC(2) 126, which is an analog and/or digital circuit or is functionally incorporated into the software of the microprocessor 114, performs the following control functions:

(1) The first pressure transducer 120 connected to the pumpage fluid side of the intensifier mechanism 56 is checked for a zero pressure, which indicates that the pump 10 is not operating. If the pressure is zero, then the output from the MCLC(2) is disabled.

(2) If the pressure from the first pressure transducer 120 is greater than zero, then the pressure from the first pressure transducer 120 is subtracted from the second pressure transducer 122 connected to the barrier fluid side of the intensifier mechanism 56.

(3) The difference in pressure is compared to a minimum allowable pressure. If the difference in pressure between the second pressure transducer 122 and the first pressure transducer 120 is less than or equal to the minimum allowable differential pressure, then the electrical signal output to the motor 104 of the barrier fluid supply arrangement 58 is turned "on". Barrier fluid is injected by the pump 98 into the circuit 50 of the dual seal assembly 16 and barrier fluid side of the intensifier mechanism 56 until the pressure difference between the second pressure transducer 122 and the first pressure transducer 120 reaches a predetermined maximum value, indicating that the pressure intensifier mechanism piston 68 has moved to the far left thereof. Once the pressure difference has reached a maximum, the motor 104 operating the pump 98 of the barrier fluid supply arrangement 56 is turned "off".

Each time the barrier fluid supply arrangement 56 is activated, an output signal from the MCLC(2) 126 is sent to the microprocessor 114 and an average leakage rate is calculated by the microprocessor 114 similar to the average leakage rate calculated for the leakage control apparatus 54 of the first embodiment of FIG. 3 described above. In addition, outputs from the first and second pressure transducers 120, 122 are connected to the A/D converter 124 which takes the voltage outputs from the pressure transducers and converts the voltages to digital outputs. The digital output signals are sent to and stored in the memory of the microprocessor 114. Recognizing the fact that the change in differential pressure is proportional to change in barrier fluid volume, calculation of instantaneous leakage rate is performed by the microprocessor 114 by calculating the change in differential pressure over time. Both average and instantaneous leakage rates are displayed digitally by displays 128, 130. Large differences in the average and instantaneous leakage rates indicate that the seal leakage rate is changing.

Knowing the average and instantaneous leakage rates for mechanical seals can be useful for scheduling pump seal maintenance. If the pump 10 is used in a large industrial or refinery application where there may be several pumps in operation, as will be described later, leakage rates can be transmitted to a central computer and entered into a database. The database, in turn, can be used for plant maintenance scheduling.

Figure 5:
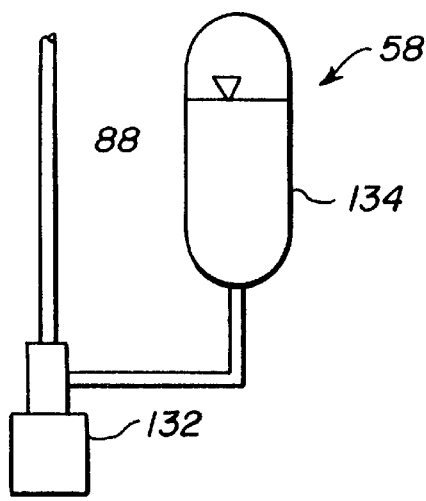
FIG. 5 is a diagrammatic view of an alternative embodiment of the barrier fluid supply arrangement which can be employed with the leakage control apparatus which operates in accordance with the method of the present invention.

Referring to FIG. 5, there is illustrated an alternative embodiment of the barrier fluid supply arrangement 58 which can be employed with the leakage control apparatus 54. As mentioned above, the barrier fluid supply arrangement 58 injects barrier fluid under pressure into the barrier fluid recirculation circuit 50 to replace barrier fluid leaked from the primary and secondary pump seals 28, 30 respectively into the pumpage fluid chamber 26 and to the external environment. The barrier fluid supply arrangement 58 in FIG. 5 utilizes a solenoid controlled valve 132 and a pressure accumulator 134 in place of the pump 98, tank 100 and motor 104 of the barrier fluid supply arrangement 58 of FIGS. 3 and 4.

Figure 6:
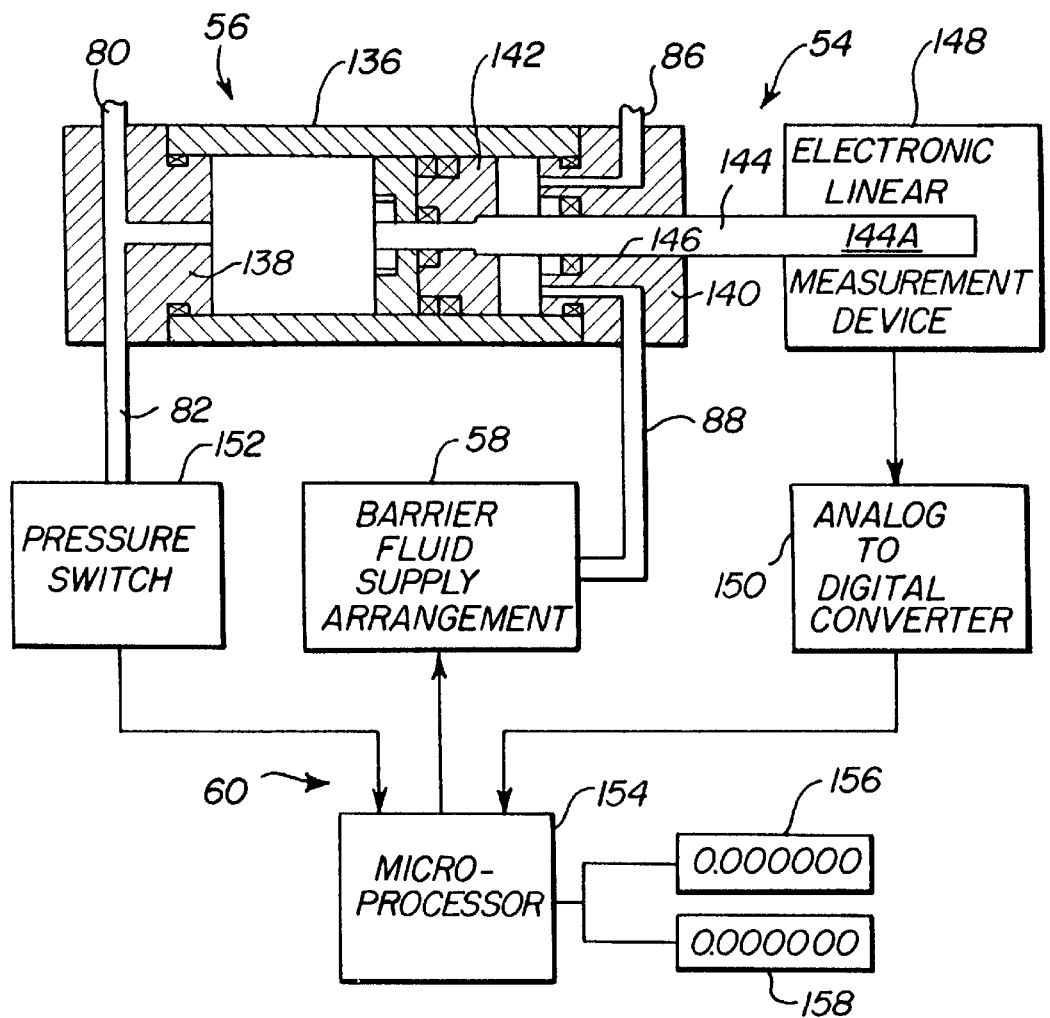
FIG. 6 is a diagrammatic view of a third embodiment of the dual mechanical seal barrier fluid leakage control apparatus which operates in accordance with the method of the present invention.

Referring to FIG. 6, there is illustrated a third embodiment of the dual mechanical seal barrier fluid leakage control apparatus 54 which operates in accordance with the method of the present invention. The third embodiment of the leakage control apparatus 54 of FIG. 6 is similar to the first and second embodiments thereof described above and illustrated respectively in FIGS. 3 and 4. First, the leakage control apparatus 54 is coupled with the dual mechanical seal assembly (not shown in FIG. 6) in the same manner. Second, the barrier fluid is maintained at the higher pressure than the pumpage fluid by the use of the pressure intensifier mechanism 56. Third, the pressure monitoring and control arrangement 60 charges the barrier fluid circuit (not shown in FIG. 6) with barrier fluid, as needed, from the barrier fluid supply arrangement 58 and calculates average and instantaneous seal leakage rates.

The primary differences between the third embodiment of the leakage control apparatus 54 of FIG. 6 and the first and second embodiments thereof of FIGS. 3 and 4 are the design of the pressure intensifier mechanism 56 and the means by which the pressure monitoring and control arrangement 60 detects and measures barrier fluid leakage. The pressure intensifier mechanism 56 shown in FIG. 6 includes a cylinder 136, a pair of first and second end manifolds 138, 140 respective mounted to pumpage fluid and barrier fluid ends of the intensifier mechanism 56, a piston 142 reciprocally mounted in the cylinder 136, and an elongated rod 144 connected at one end to the piston 142 and protruding from the second end manifold 140 through a passage 146 defined therethrough at the barrier fluid end of the intensifier mechanism 56. The rod 144 reduces the effective area on the right or barrier fluid side of the piston 142, thereby creating a higher fluid pressure in the right end of the cylinder 136. Thus, like the intensifier mechanism 56 of the leakage control apparatus 54 of FIGS. 3 and 4, the intensifier mechanism 56 of the leakage control apparatus 54 of FIG. 6 ensures that the barrier fluid pressure is always higher than the pumpage fluid pressure.

However, unlike in the first and second embodiments of FIGS. 3 and 4, the leakage control apparatus 54 in the third embodiment of FIG. 6 includes an electronic linear measurement device 148 coupled to the protruding end portion 144A of the elongated rod adjacent to and exterior of the second end manifold 140. The measurement device 148 measures the movement and position of the piston 142 relative to the cylinder 136. The electronic linear measurement device 148 can take the form of any one of several types of passive or active electronic linear measurement components, such as variable resistance type, electromagnetic-linear transformer type, acoustic type, optical type and mechanical switch type. All types of the linear measurement device 148 generates an electrical output signal (voltage, current or digital pulses) indicating movement of the intensifier piston 142. Movement of the piston 142 is directly proportional to the amount of barrier fluid leaked or added to the barrier fluid circuit (not shown in FIG. 6) via the flow lines 86, 88. The resulting electrical signal from the linear measurement device 148 is inputted to the pressure monitoring and control arrangement 60 that adds barrier fluid to the circuit as needed and calculates average and instantaneous seal leakage rates.

When barrier fluid leakage occurs, it is clearly indicated by movement of the pressure intensifier mechanism piston 142 and rod 144 toward the barrier fluid or second end manifold 140 of the intensifier mechanism 56. This movement is picked up by the electronic linear measurement device 148 and generates an electrical signal output (voltage, current or digital pulses).

The pressure monitoring and control arrangement 60 includes an analog-to-digital converter 150, a pressure switch 152, a microprocessor 154 and digital displays 156, 158. The output signal from the electronic linear measurement device 148 is sent to the A/D converter 150 if the output is analog and then is sent to the microprocessor 154. If the output is digital or generated by limit switches, then the output is routed directly to the microprocessor 154. The microprocessor 154 also may collect information from the pressure switch 152 connected to the pumpage fluid end of the intensifier mechanism 56 concerning the status of the pump (not shown). However, the provision of pressure switch 152 is an option, not essential to the operation of the arrangement 60.

A software program stored in the microprocessor 154 operates and controls three functions. The first function controls the barrier fluid supply arrangement 58 to ensure at all times an adequate supply of barrier fluid in the intensifier mechanism 56 and in the barrier fluid circuit connected with the dual seal assembly. This function is similar to the that performed by the MCLC(1) 112 and MCLC(2) 126 in the first and second embodiments of the leakage control apparatus 54 in FIGS. 3 and 4. The logic for this first software program function is as follows:

(1) Calculate the current position of the intensifier mechanism piston 142 and rod 144.

(2) Compare the calculated position of the intensifier mechanism piston 142 and rod 144 to maximum and minimum stored position values. If the current position is greater than or equal to the maximum position, then the barrier fluid supply arrangement 58 is turned "on". If the current position is less than or equal to the minimum position, then the barrier fluid supply arrangement 58 is turned "off".

(3) Go to step (1).

Although this control function is performed digitally with software, it could be performed by a control logic circuit when the same software logic is designed into the hardware.

The second software program control function calculates an average leakage rate of the barrier fluid, knowing the displacement of the piston 142, the area of the barrier fluid side of the piston, and the time duration for the displacement. The logic for the second software program function is as follows:

(1) Calculate the current position of the intensifier mechanism piston 142 and rod 144 immediately after the barrier fluid supply arrangement 58 is turned "off".

(2) Save the current calculated position of the intensifier mechanism piston and the current date and time in the microprocessor memory as an initial position and start time.

(3) Add a stored positional constant to the initial position to calculate a final position. Store the final position in memory.

(4) If the final position is greater than the maximum position in the first function described above, then set the maximum position equal to the final position.

(5) Calculate the new position of the intensifier mechanism piston 142 and rod 144.

(6) If the current position is greater than or equal to the final position, then save the current date and time as the final date and time and do the following:

(a) Calculate the linear displacement by subtracting the initial displacement from the final displacement.

(b) Calculate the volume displaced by multiplying the linear displacement by the effective piston area.

(c) Calculate the time duration from the initial time to the final time by subtracting the initial time from the final time.

(d) Calculate the leakage rate by dividing the volume by the time duration.

(e) Update the digital display with the new leakage rate.

(f) Go to step (1).

(7) Go to step (5).

The logic for the second software program function can be simplified by using the minimum stored position in the first software program function for the initial position, and by using the maximum stored value in the first software program function for the final position.

The third software program function calculates an instantaneous leakage rate of the barrier fluid. Calculating the instantaneous leakage rate follows the same logic as the average leakage rate, except that the distances, volumes and times are much smaller.

Another software program or algorithm can be used to calculate the average and instantaneous leakage rates. This software function is time based rather than positional based. The logic for this alternative software function is as follows:

(1) Calculate the current position of the intensifier mechanism piston 142 and rod 144.

(2) Save the current calculated position of the intensifier mechanism piston 142.

(3) Wait for a given constant period of time, for example, one hour.

(4) Calculate the new position of the intensifier mechanism piston 142 and rod 144.

(5) Calculate the linear displacement by subtracting the initial displacement (1) from the final displacement (4).

(6) Calculate the volume displaced by multiplying the linear displacement by the effective piston area.

(7) Calculate the leakage rate by dividing the volume by the time constant.

(8) Update the digital display with the calculated leakage rate.

(9) Go to step (1).

For instantaneous leakage rate calculations the time constant is changed to a small value, for example one second.

Figure 7:
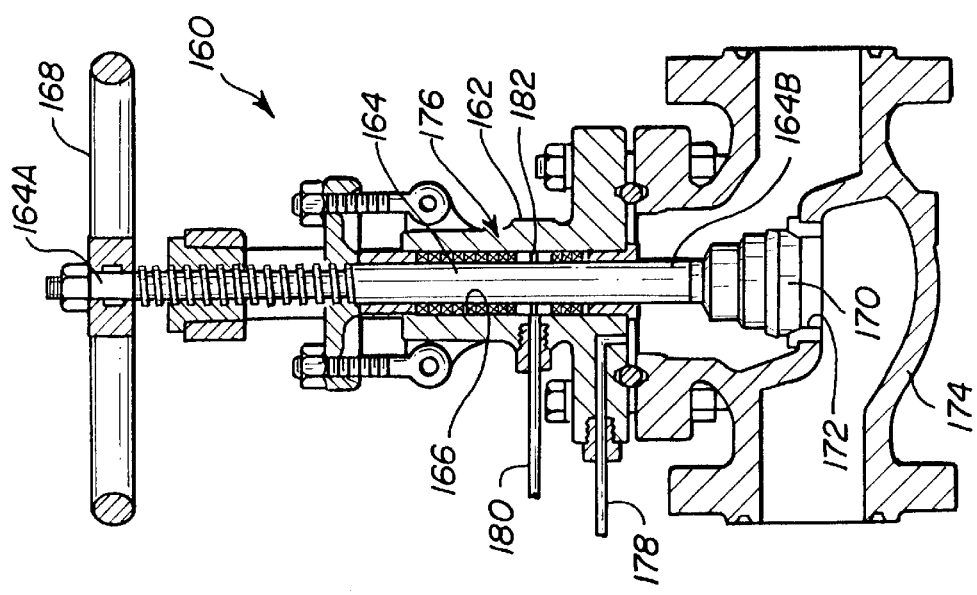
FIG. 7 is a longitudinal axial sectional view of a prior art dual mechanical seal assembly employed by a valve.

Referring to FIG. 7, there is illustrated fluid handling equipment in the form of a prior art valve 160 having a valve bonnet 162 and a central shaft 164 mounted through an elongated central bore 166 defined through the valve bonnet 162. The shaft 164 is mounted to undergo both rotational and axial movement relative to the valve bonnet 162 by rotation of a handle 168 on the outer end 164A of the shaft 164 in order to cause respective seating and unseating of an enlarged head 170, being attached to the inner end 164B of the shaft 164, onto and from an opening 172 formed in a flow coupler 174. The uncovered opening 172 will permit flow of fluid through the coupler 174.

The valve 160 incorporates a seal assembly 176 also being in the form of a dual mechanical seal type. The dual seal assembly 176 is composed of packing elements that are equivalent in function to the above-described primary and secondary seals 28, 30 of the dual seal assembly 16 of the pump 10 and therefore need not be described in detail. Also, the valve bonnet 162 is modified to incorporate two fluid flow lines 178, 180, the one fluid flow line 178 being connected in flow communication to the pumpage fluid flowing through the coupler 174 and controlled by the head 170 on the valve haft 164 and the other fluid flow line 180 being connected in flow communication to the annular chamber 82 surrounding the shaft 164 and containing the barrier fluid.

In order for the above-described dual seal assembly 176 to perform satisfactorily and prevent leakage of pumpage fluid into the barrier fluid chamber 182 and therefrom to the external atmosphere, the pressure of the barrier fluid must remain a desired amount above the pressure of the pumpage fluid. As will be described hereinafter, the valve 160 can be coupled via the fluid flow lines 178, 180 to various embodiments of the leakage control apparatus 54 which are similar to those described above with reference to the rotary pump 10.

Figure 8:
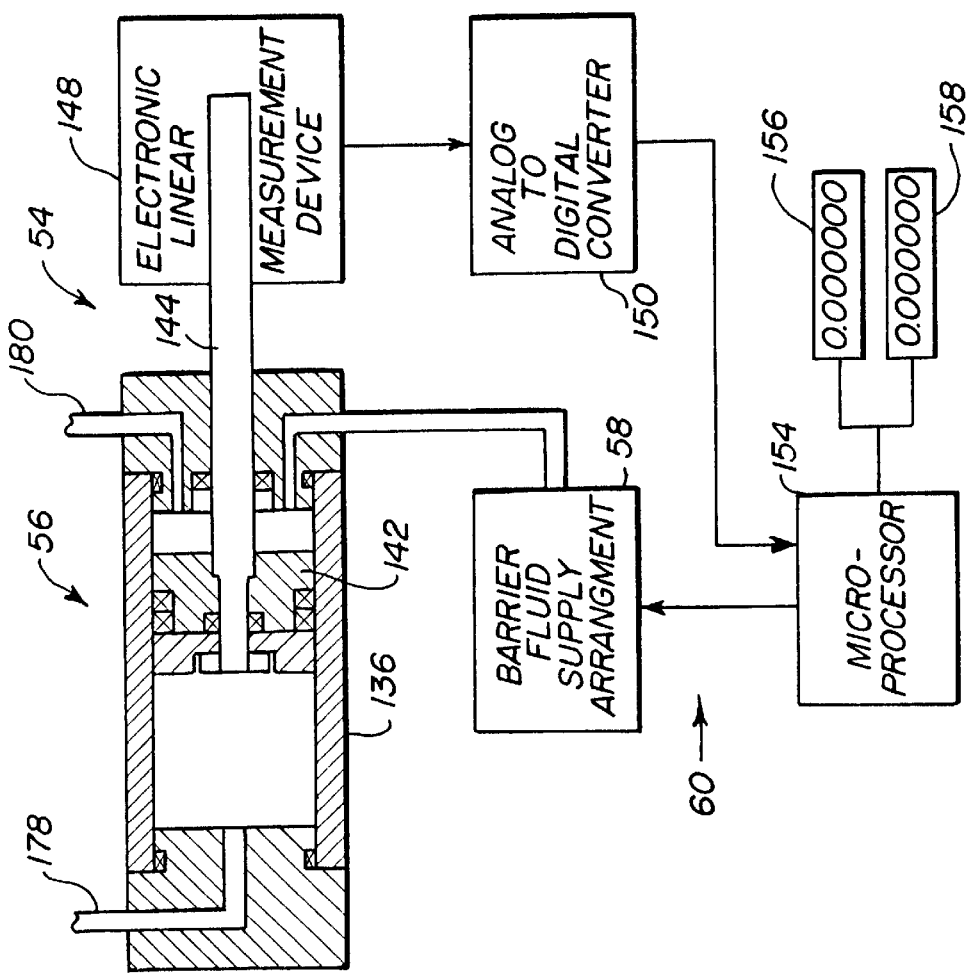
FIG. 8 is a diagrammatic view of the third embodiment of the control apparatus applied to the valve of FIG. 7 wherein the pumpage and barrier fluids are liquid.

Referring to FIG. 8, there is illustrated a leakage control apparatus 54 which is similar to the apparatus 54 already described earlier with reference to FIG. 6. Thus, the components of the apparatus 54 in FIG. 8 which are similar to the components of the apparatus 54 in FIG. 6, are identified by the same reference numerals as used in FIG. 6. The only difference now is the absence from the pressure intensifier mechanism 56 of FIG. 8 of the pressure switch 152 on the side of the pumpage fluid flow line 178 of the pressure intensifier mechanism 56 in FIG. 6. The pressure switch 152 is not essential to the operation of the leakage control apparatus 54. The apparatus 54 operates satisfactorily for valves controlling high or low pressure at temperatures near ambient. Also, the embodiment of the leakage control apparatus 54 of FIGS. 6 and 8 operate satisfactorily for valves 160 which control a liquid fluid.

Figure 9:
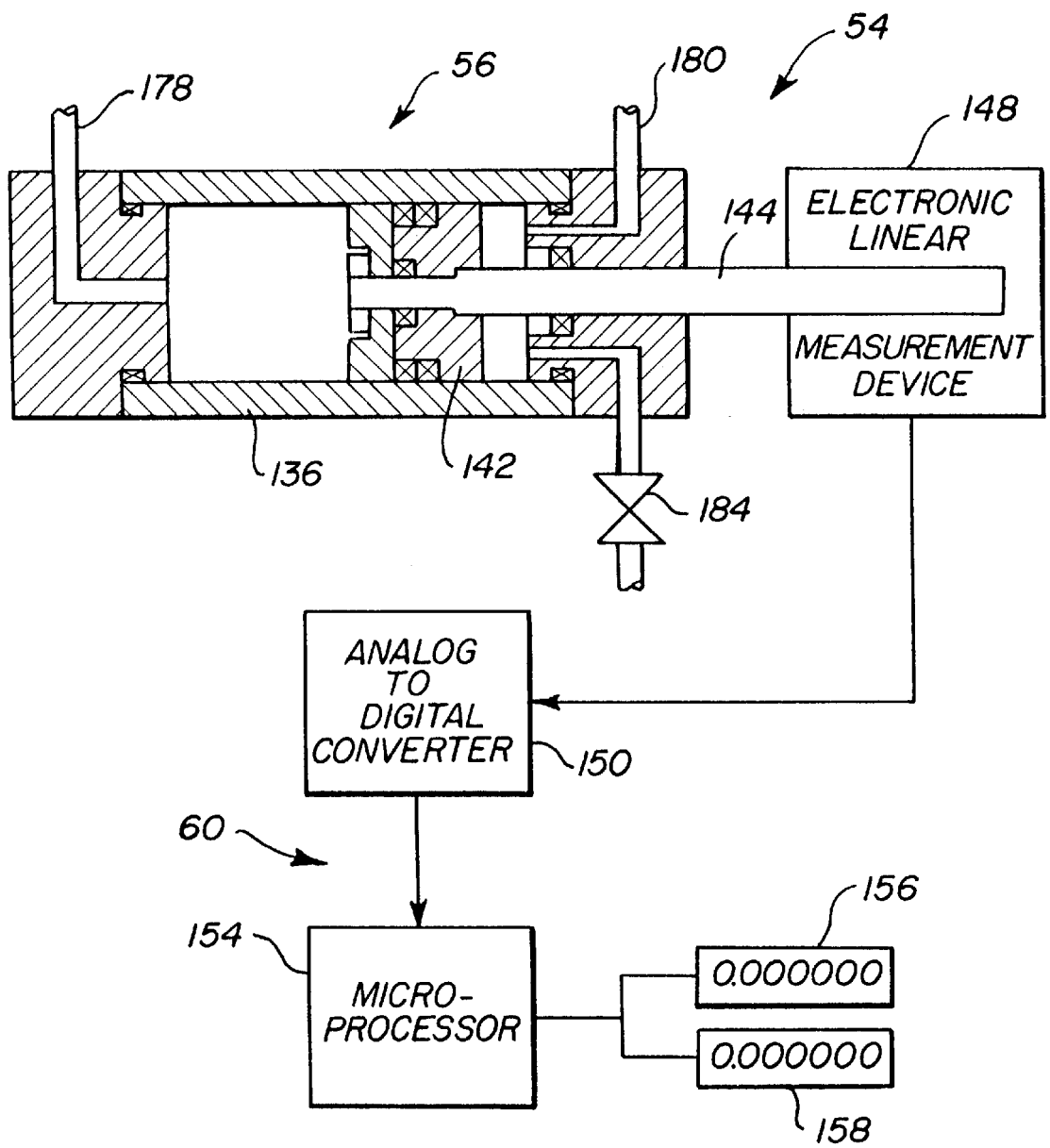
FIG. 9 is a fragmentary diagrammatic view of a modified form of the third embodiment of the control apparatus of FIG. 8.

Referring to FIG. 9, there is illustrated a leakage control apparatus 54 which is similar to the leakage control apparatus 54 of FIG. 8. Thus, the components of the apparatus 54 of FIG. 9 which are similar to the components of the apparatus 54 in FIG. 8, are identified by the same reference numerals as used in FIG. 8. The only differences between the arrangement of FIG. 9 and that of FIG. 8 are the absence of the barrier fluid supply arrangement 58 in FIG. 9 and the addition of a charging valve 184 in FIG. 9. The barrier fluid supply arrangement 58 is only needed in applications where large leakage quantities can be tolerated. In the apparatus 54 of FIG. 9, the reservoir for the barrier fluid is the pressure intensifier mechanism 56 itself and only a small amount of barrier fluid can be leaked before more liquid must be added. The charging valve 184 is used for charging the pressure intensifier mechanism 56 with barrier fluid. This apparatus 54 of FIG. 9 also works well for valves controlling high or low pressure at temperatures near ambient.

Figure 10:
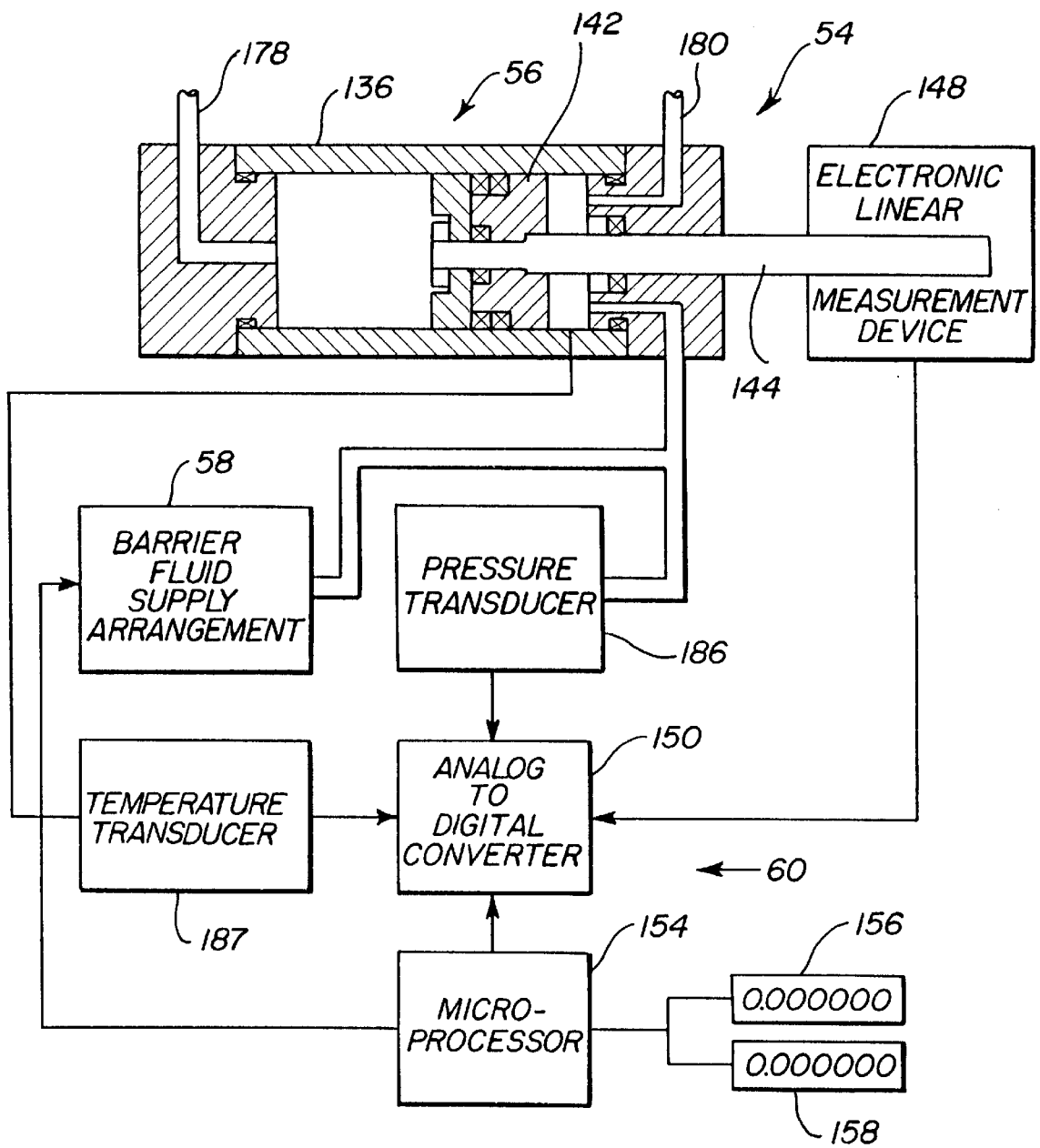
FIG. 10 is a diagrammatic view of another modified form of the third embodiment of the control apparatus applied to the valve of FIG. 7 wherein the pumpage and barrier fluids are gases.

Referring to FIG. 10, there is illustrated a leakage control apparatus 54 adapted for handling a gas fluid whose arrangement is similar to the apparatus 54 of FIG. 8 which is adapted for handling a liquid fluid. Thus, the components of the apparatus 54 in FIG. 8 which are similar to the components of the apparatus 54 in FIG. 10, are identified by the same reference numerals as used in FIG. 8. The basic operation of the apparatus 54 of FIG. 10 in a gas barrier fluid application is the same as in the liquid barrier fluid application; gas barrier fluid is maintained at a higher pressure than the valve gas fluid pressure and leakage is detected from movement of the protruding rod 144 of the pressure intensifier mechanism 56, indicating a change in gas barrier fluid volume. However, unlike in the liquid barrier fluid application, pressure and temperature of the barrier gas must be measured and converted to a digital input for leakage rate calculations. Thus, pressure and temperature transducers 186, 187 are added to the apparatus 54 of FIG. 10 to sense the pressure and temperature of the barrier gas in the intensifier mechanism 56 and output the sensed temperature to the A/D converter 150.

Since pressure and temperature will change the volume of the barrier gas, these parameters are measured in addition to barrier fluid volume to calculate leakage rates of the barrier gas. The calculations for barrier gas leakage are considerably more complex than barrier liquid leakage calculations since the compressibility of the barrier gas must be considered. Results from the leakage calculations are expressed in "moles" of barrier gas leaked per unit of time, or mass of barrier gas leaked per unit of time, or volume of gas leaked at standard temperature and pressure (STP). The gas leakage control and measurement arrangement 60 of FIG. 10 is used for both high and low temperature applications.

The quantity of barrier gas between the seals of the dual seal assembly 176 of the valve 160 is controlled by the position of the piston 142 of the pressure intensifier mechanism 56, using the same software program or algorithm as described earlier for a liquid barrier fluid. Another software program or time-based algorithm used for calculating leakage rates for a gas barrier fluid is as follows:

(1) Read the current position of the intensifier mechanism piston 142. Start average calculation time timer. (2) Calculate the volume of barrier gas between the seals and in the intensifier knowing the position of the intensifier mechanism piston 142, the effective area of the piston 142, and the maximum volume between the seals and in the intensifier.

(3) Read the pressure of the barrier gas.

(4) Read the temperature of the barrier gas.

(5) Calculate the mass of the barrier gas between the seals using the volume calculated in (2) above and the barrier gas temperature and pressure. The calculation requires an equation of "state" e.g., van der Waal's equation of state, or other known equations of state of greater accuracy, namely: (a) Beattie-Bridgeman equation of state, (b) Benedict-Webb-Rubin equation of state, (c) Strobridge equation of state, and (d) Virial equation of state.

(6) Wait for a given constant period of time, for example one hour.

(7) Repeat steps (1) through (5) above.

(8) Calculate the change in the barrier gas mass between the seals by finding the difference in the values calculated in (5).

(9) Calculate the barrier gas mass leakage rate per unit time by dividing the value calculated in (8) above by the elapsed time (6) above.

(10) Convert the leakage rate to correct units for display.

(11) Add mass leaked and time interval to running totals for average leakage rate calculations.

(12) If the elapsed time equals the average calculation time, then calculate the average leakage rate by dividing total mass leaked by total time.

(13) Convert the average leakage rate to the correct units for display. Reset average calculation time timer.

(14) Got to step (1).

Figure 11:
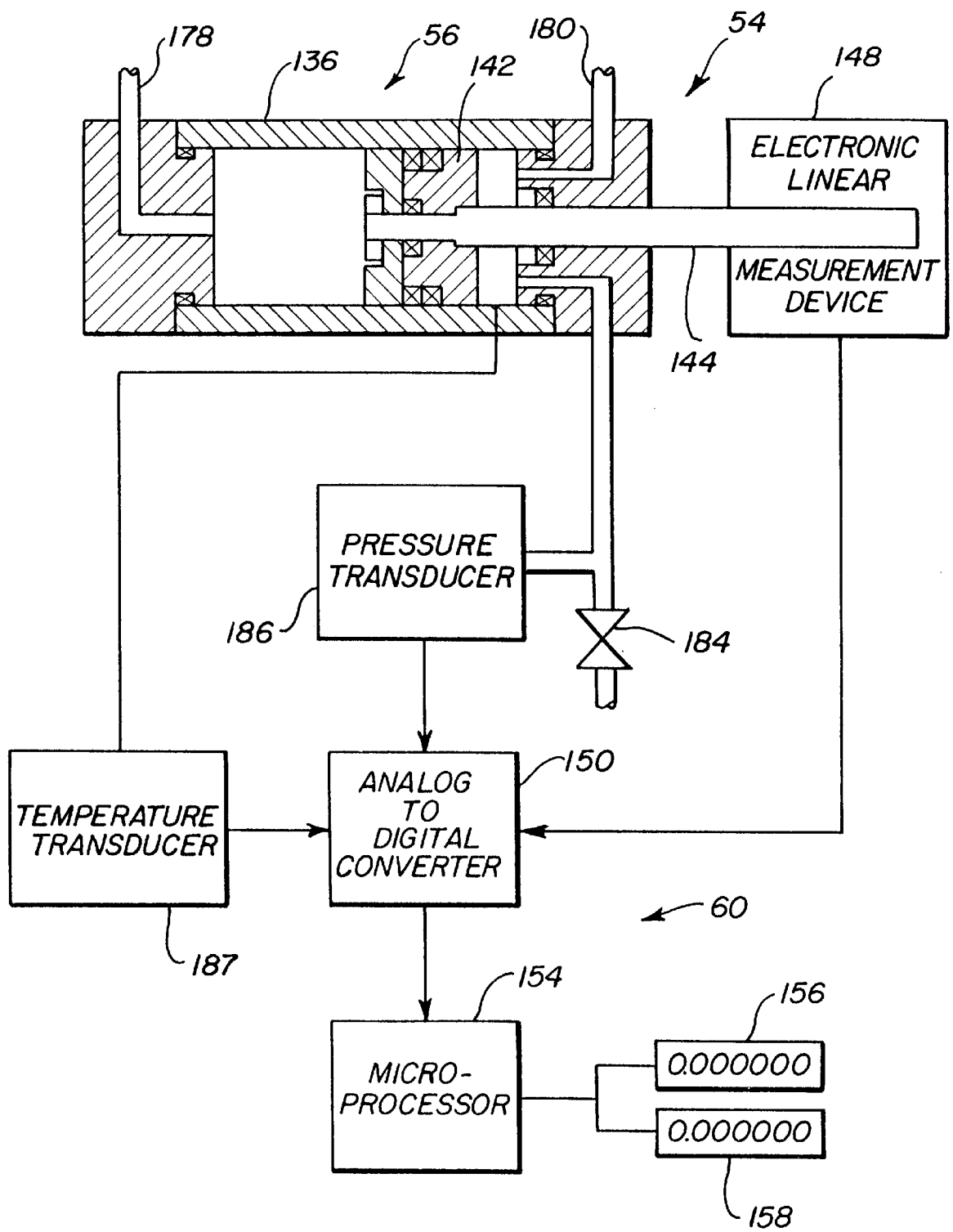
FIG. 11 is a fragmentary diagrammatic view of a further modified form of the modified third embodiment of the control apparatus of FIG. 10.

Referring to FIG. 11, there is illustrated a leakage control apparatus 54 which is similar to the leakage control apparatus 54 of FIG. 10. Thus, the components of the apparatus 54 of FIG. 11 which are similar to the components of the apparatus 54 in FIG. 10, are identified by the same reference numerals as used in FIG. 10. The only differences between the arrangement of FIG. 11 and that of FIG. 10 are the absence of the barrier fluid supply arrangement 58 in FIG. 11 and the addition of a charging valve 184 in FIG. 11. The barrier fluid supply arrangement 58 is only needed in applications where large leakage quantities can be tolerated. In the apparatus 54 of FIG. 11, the reservoir for the barrier fluid is the pressure intensifier mechanism 56 itself and only a small amount of barrier fluid can be leaked before more liquid must be added. The charging valve 184 is used for charging the pressure intensifier mechanism 56 with barrier fluid. The apparatus 54 of FIG. 11 also works well for valves controlling fluid at high or low temperatures.

Figure 12:
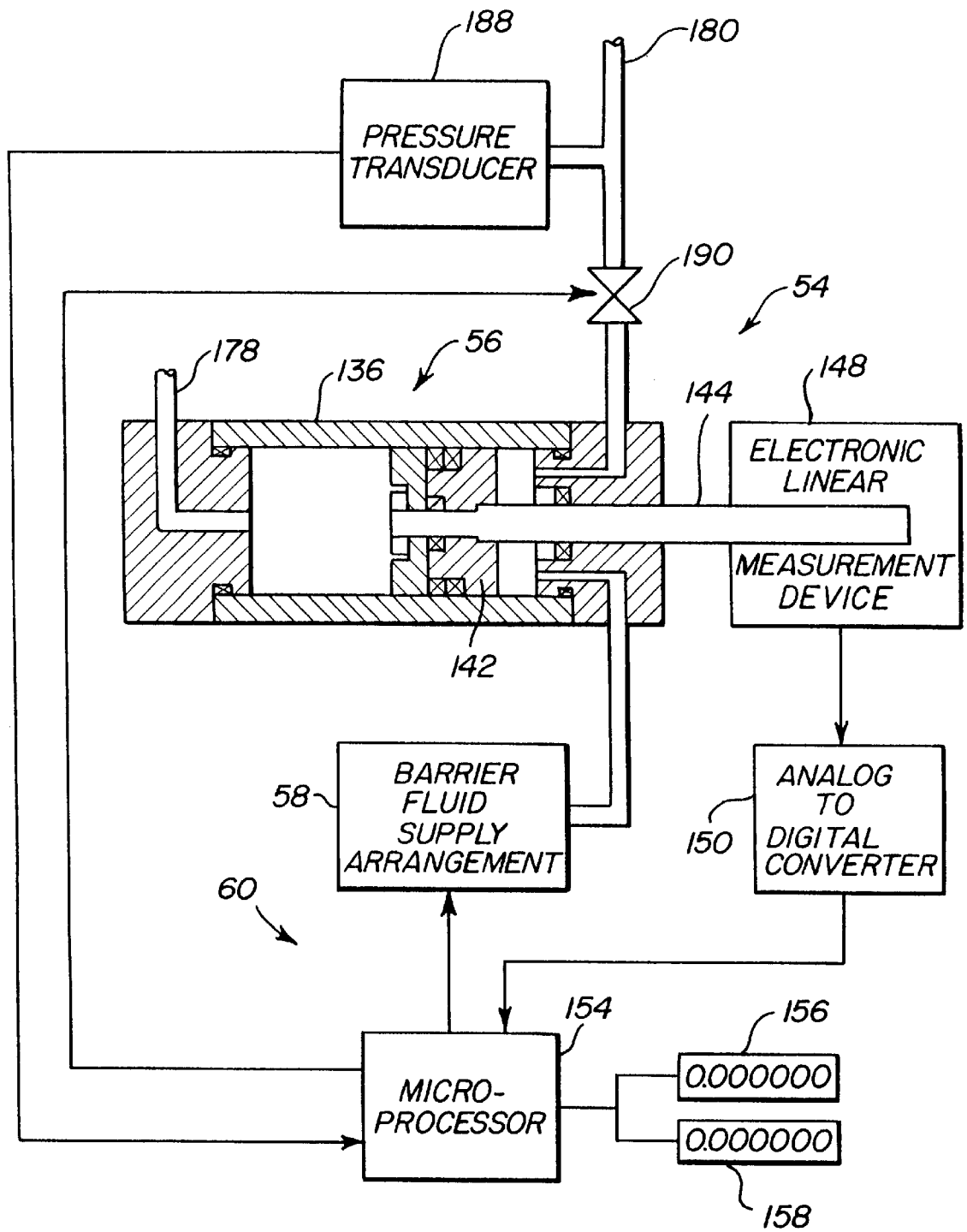
FIG. 12 is a fragmentary diagrammatic view of another modified form of the modified third embodiment of the control apparatus of FIG. 8.
Figure 13:
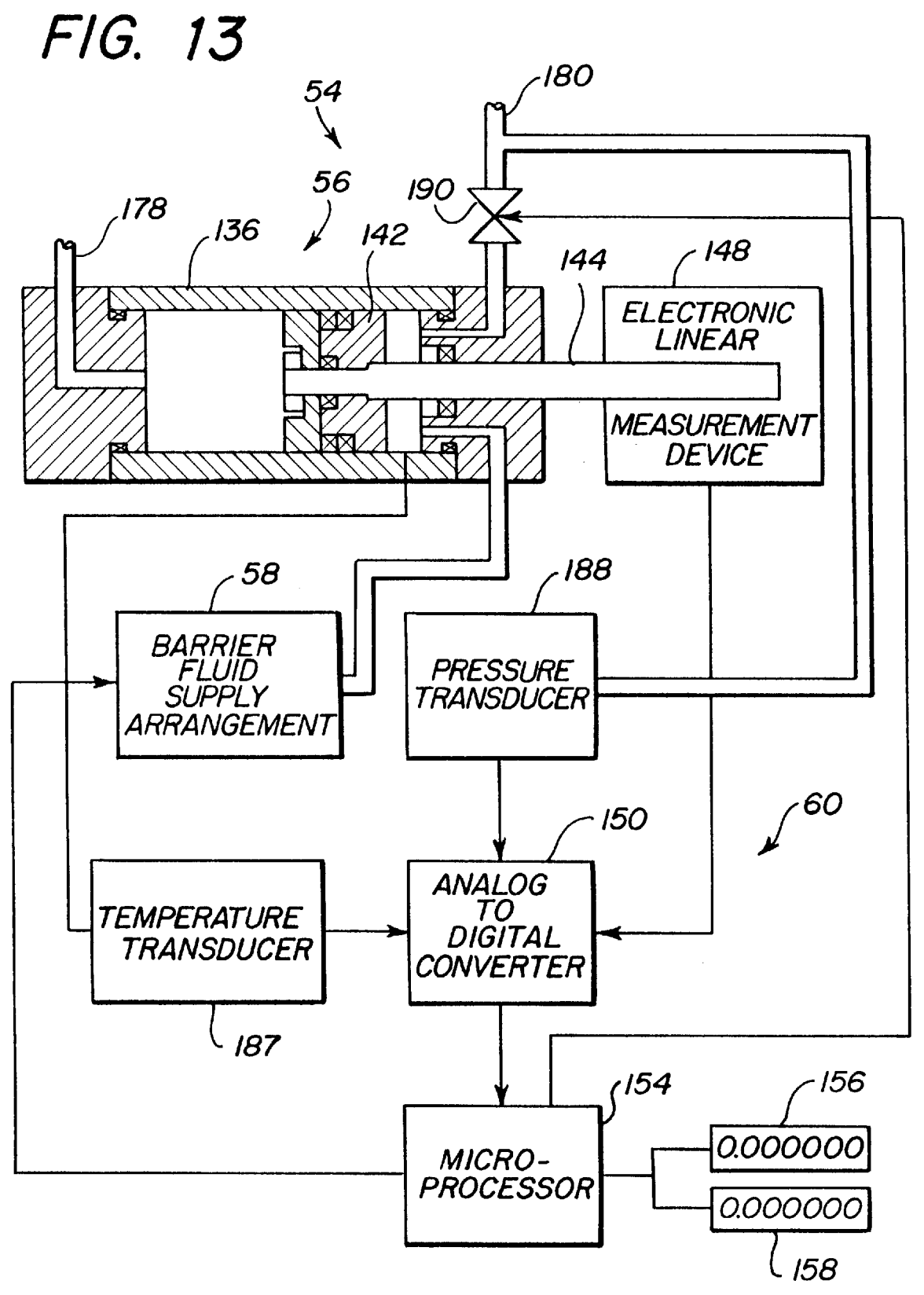

Referring to FIGS. 12 and 13, there is illustrated respective arrangements of the apparatus 54 for liquid and gas barrier fluid applications that are similar to respective arrangements of the apparatus 54 of FIGS. 8 and 10. The arrangements of FIGS. 12 and 13 use a pressure transducer 188 interposed in the barrier fluid flow line 180 between the barrier fluid chamber 182 of the valve 160 and the pressure intensifier mechanism 56, and a barrier fluid isolation valve 190 interposed in the barrier fluid flow line 180 between the pressure transducer 188 and the pressure intensifier mechanism 56. The barrier fluid isolation valve 190 is used to determine where the barrier fluid is leaking. The isolation valve 190 is normally left open during operation. However, when it is important to determine where the barrier fluid is leaking—into the atmosphere or into the process fluid—this valve 190 is closed and the pressure of the barrier fluid is monitored over time. If the barrier fluid pressure drops to the process fluid pressure but no lower, then the barrier fluid is leaking into the process fluid and not into the atmosphere. But, if the barrier fluid pressure drops below the pressure of the process fluid, then the barrier fluid is leaking into the atmosphere and may also be leaking into the process fluid as well. The system continues with its normal operation after determining where the leakage is located.

Determining where barrier fluid is leaking can also be accomplished without the addition of the isolation valve 190 to the apparatus 54. Finding where the barrier fluid is leaking without an isolation valve is accomplished by waiting for the barrier fluid to leak enough until the intensifier mechanism piston 142 has moved all the way to the right of the cylinder 136 without recharging the intensifier mechanism 56 with barrier fluid. After the piston 142 has moved all the way to the right end of the cylinder 136 and "bottomed out," the pressure of the barrier fluid is monitored over time as described above. If the barrier fluid pressure drops to the process fluid pressure but no lower, then the barrier fluid is leaking into the process fluid and not into the atmosphere. But, if the barrier fluid pressure drops below the pressure of the process fluid, then the barrier fluid is leaking into the atmosphere and may also be leaking into the process fluid as well. The apparatus continues with its normal operation after determining where the leakage is located.

However, the advantage of the use of the isolation valve 190 is that the test for leakage can be done at any time. The other method of making this test requires time for the piston 142 to move all the way to the right in the cylinder 136 before the test can be performed.

Figure 14:
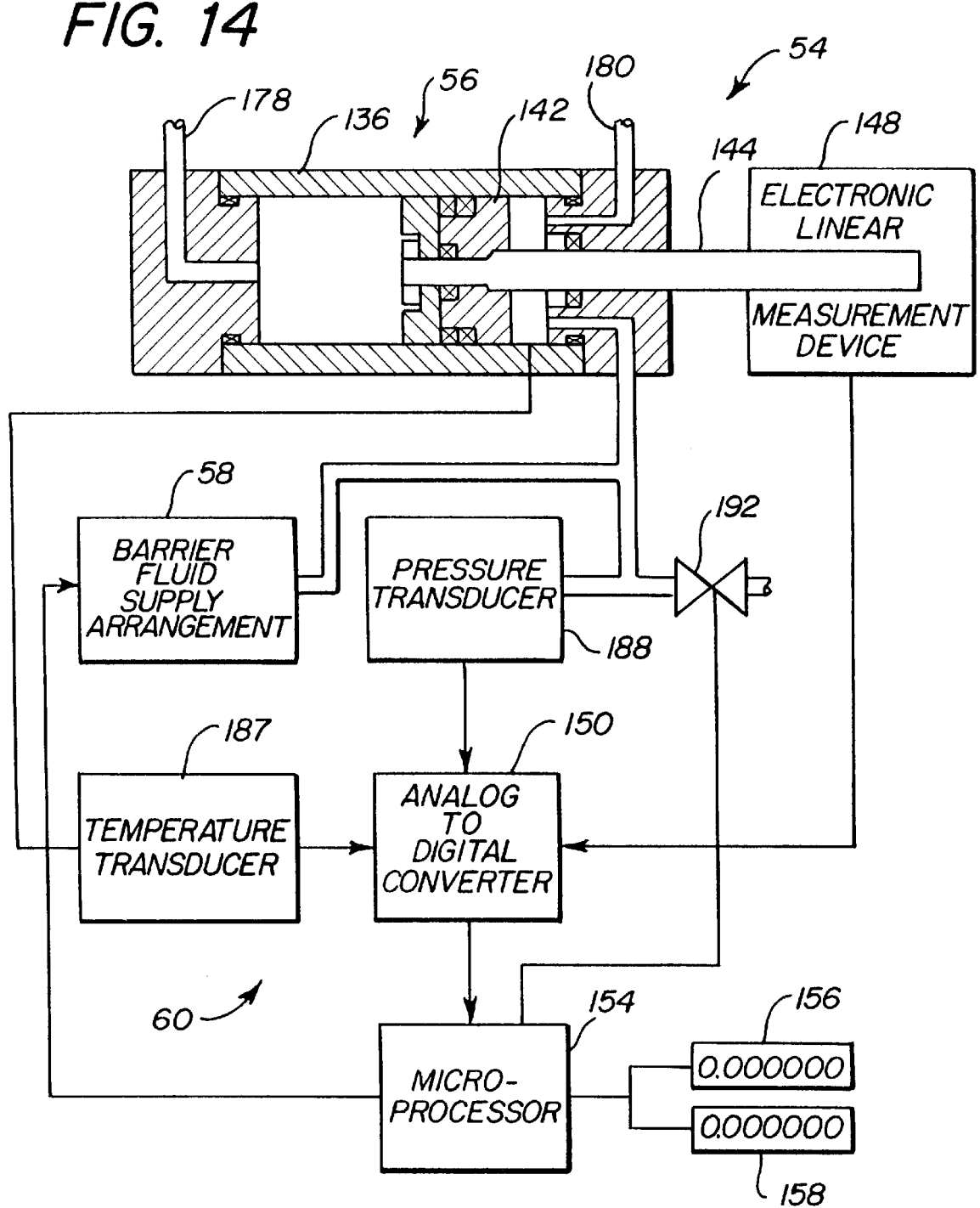
FIG. 14 is a fragmentary diagrammatic view of still another modified form of the modified third embodiment of the control apparatus of FIG. 10.

Referring to FIG. 14, there is illustrated a leakage control apparatus 54 which is similar to the leakage control apparatus 54 of FIG. 10. Thus, the components of the apparatus 54 of FIG. 14 which are similar to the components of the apparatus 54 in FIG. 10, are identified by the same reference numerals as used in FIG. 14. The only differences between the arrangement of FIG. 14 and that of FIG. 10 is the use of a pressure relief valve 194 connected to the barrier gas volume in the pressure intensifier mechanism 56. The barrier gas pressure relief valve 194 is used to control the barrier gas pressure where there are large changes in the process fluid pressure. For example, closing the valve 160 connected to the intensifier mechanism 56 can cause a drop in process fluid pressure causing the piston 142 to move to the left as the barrier gas is allowed to expand. If the process fluid pressure drops low enough, the piston 142 will move to the left end of the cylinder 136 and stop. Once the piston 142 is positioned at the left end of the cylinder 136, the barrier gas pressure cannot be lowered to compensate for the lowering of the process fluid pressure. Although the barrier gas pressure is still higher than the process fluid pressure, it is no longer at a pre-set level above the process fluid.

To prevent the piston 142 from moving all the way to the left end of the cylinder 136, the pressure relief valve 192 is added along with controlling software to open the valve when necessary. The controlling software senses the position of the piston 142 by reading the output from the electronic linear measurement device 148. If the piston 142 is at the far left end of the cylinder 136, just about to contact the end of the cylinder, then the pressure relief valve 192 is opened, reducing the barrier fluid pressure and preventing the piston from making contact with the left end of the cylinder 136. The pressure relief valve 192 is closed when the piston 142 moves to the right, back from the left end of the cylinder 136 to the normal operating range of the piston's stroke.

While the pressure relief valve 192 is open the leakage calculation software is suspended. When the pressure relief valve 192 is finally closed the leakage calculation software is re-initialized.

Figure 15:
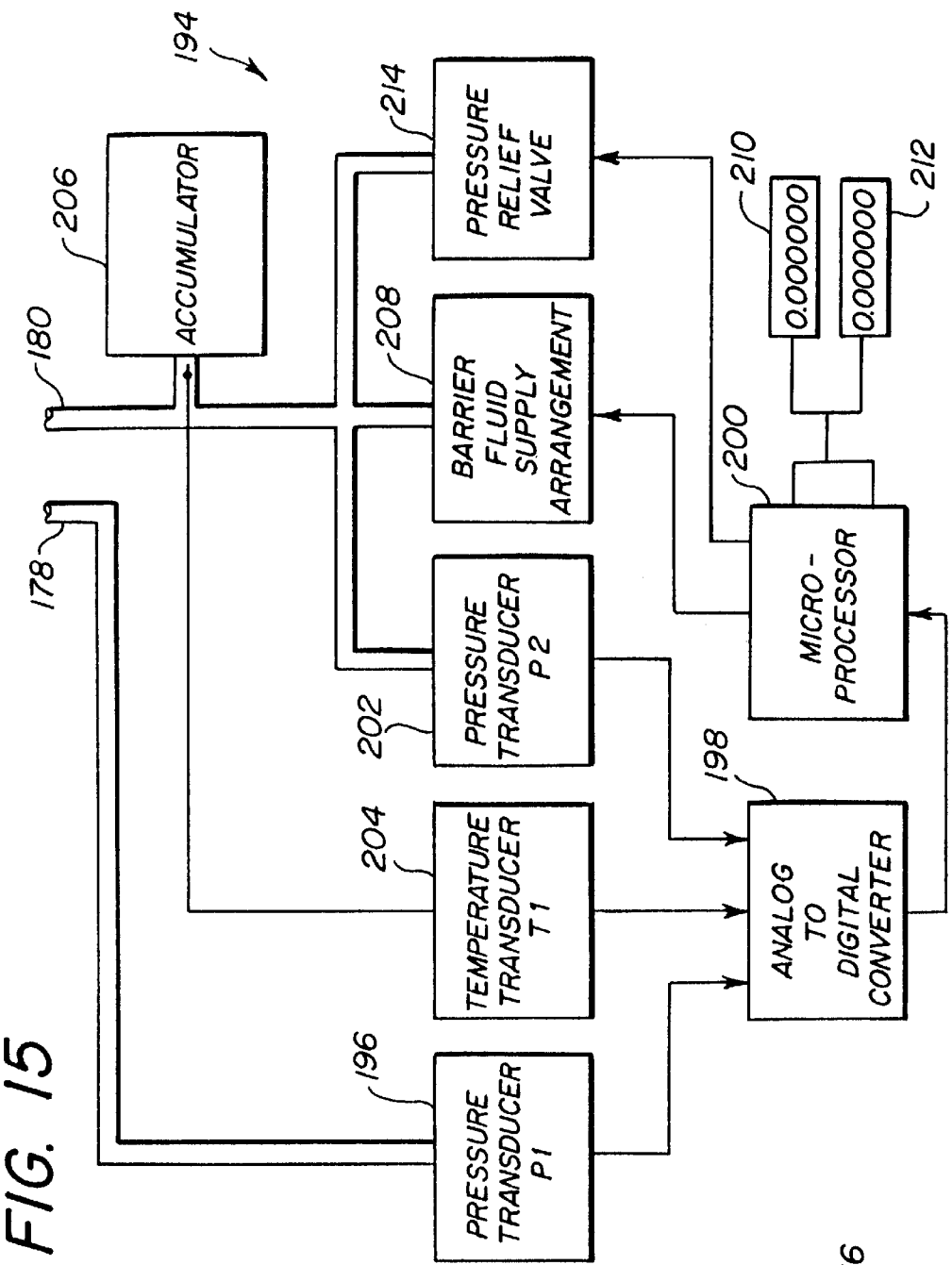
FIG. 15 is a diagrammatic view of a fourth embodiment of the dual mechanical seal barrier fluid leakage control apparatus which operates in accordance with the method of the present invention.

Referring to FIG. 15, there is illustrated a fourth embodiment of a barrier fluid leakage control apparatus 194 which operates using a liquid barrier fluid (or, alternatively, a gas barrier fluid), but does not use the pressure intensifier mechanism 56 nor the electronic linear measurement device 148 of the control apparatus 54 described above with reference to FIGS. 6 to 14. The operation of barrier fluid leakage control apparatus 194 begins with measurement of the process fluid pressure via process inflow line 178 with a first pressure transducer 196. The analog voltage output from the first pressure transducer 196 is converted to a digital signal by an analog to digital (A/D) converter 198 and transmitted therefrom to a microprocessor 200. A second pressure transducer 202 measures the barrier liquid pressure between the dual seals. This pressure, also represented by an analog voltage, is converted to a digital signal with the aid of the A/D converter 198 and sent to the microprocessor 200. Finally, a temperature transducer 204 measures the temperature of the gas volume in an accumulator 206 and generates a third analog voltage representing such temperature which is converted by the A/D converter 198 to a digital signal and sent to the microprocessor 200. The pressure measurement P1 from the process fluid is compared to the pressure measurement P2 from the barrier fluid. If pressure P2 is less than 109% of P1, then a signal is sent to the barrier fluid supply arrangement 208 to increase the barrier pressure. If pressure P2 is more than 111% of P1, then a signal is sent to the pressure relief valve to lower the barrier fluid pressure. This process operates continuously maintaining the pressure P2 at 110% of P1 with plus or minus 1% tolerance. Other percent pressure ranges can be used for various applications by changing parameters within the microprocessor software.

Each time barrier fluid is added between the dual seals to maintain pressure, three calculations are performed. These calculations use the temperature of the accumulator gas to determine the volume of barrier fluid between the dual seals. The first calculation calculates the volume of barrier fluid between the dual seals before the addition to the barrier fluid is made. In calculation two, the volume of barrier fluid between the dual seals is calculated after the addition of barrier fluid is made. In calculation three, the difference is calculated between the volume calculated after the previous correction cycle, or volume calculation number two, and before the next pressure correction cycle, or volume calculation number one, and then is divided by elapsed time. The first two calculations are computed using an equation "of state" for the accumulator gas, e.g. van der Waal's equation and the other more accurate equations mentioned earlier. The last of these calculations, the third calculation, is the amount of barrier fluid leaked from the volume between the dual seals divided by the elapsed time between barrier fluid addition. This is the leakage rate of barrier fluid.

The process of recalculating the leakage rate every time a correction is made to the barrier fluid pressure may not be frequent enough to give accurate leakage results. For example, if there is very little leakage and the tolerance for pressure control is relatively high, there may be a long time before an updated leakage value is calculated and displayed on displays 210, 212 connected to the microprocessor 200. Furthermore, there will be a problem with the first pressure correction cycle calculation since no previous calculation exists. To prevent these problems the microprocessor 200 can be programmed to recalculate the barrier fluid leakage after a given elapsed time period, for example, once every minute. Another possible approach to these problems is to recalculate the leakage rate after the microprocessor 200 has been sent a signal from a local switch or another microprocessor.

Another useful piece of information about the barrier fluid leakage rate is the long term average leakage rate displayed on display 212. This calculated value, compared to the instantaneous leakage rate displayed on display 210, indicates if there is a progressive leakage problem. Average leakage rates are calculated by storing and averaging leakage rates over long periods, for example, one week.

In some process sealing applications it is important to determine where the barrier leakage is going: into the atmosphere or into the process fluid. To determine where the barrier fluid is leaking, another software program is used. This software program determines where the barrier fluid is leaking by suspending the pressure correction control software and measuring the change in barrier fluid pressure over time. If the barrier fluid pressure drops to the process fluid pressure but no lower, then the barrier fluid is leaking into the process fluid and not into the atmosphere. But, if the barrier fluid pressure drops below the pressure of the process fluid, the barrier fluid is leaking into the atmosphere and may also be leaking into the process fluid as well. After this software execution is completed, the pressure control and leakage measurement software execution is reinstated.

A software program or alogrithm for pressure control and leakage measurement is as follows:

(1) Read the values from the first and second pressure transducers 196, 202.
(2) If P2 is less than 109% of P1 or if P2 is greater than 111% of P1 or if the time from the last leakage rate calculation was greater than the maximum calculation interval, then (a) Calculate the volume of the barrier liquid (or, in the alternative case, the mass of the barrier gas) between the seals and in the accumulator (temperature is used for this calculation is gas is used in the accumulator 206) and assign this volume to a variable called End_Volume (or, in the alternative case, a variable called End_Mass).
(b) Stop timer.
(c) Calculate new leakage rate by subtracting End_Volume (or End_Mass in the alternative case of a barrier gas) from Start_Volume (or Start_Mass in the alternative case of a barrier gas) and dividing by the time interval.
(d) If P2 is less than 109% of P1, then turn on the barrier fluid supply arrangement 208 until P2 increases to 110% of P1. If P2 is greater than 111% of P1, then turn on the pressure relief valve 214 until P2 drops to 110% of P1.
(e) Calculate the volume of barrier liquid (or the mass of the barrier gas in the alternative case) between the seals and in the accumulator 206 (temperature is used for this calculation if gas is used in the accumulator) and assign this volume to a variable called Start_Volume (a variable called Start_Mass in the alternative case of a barrier gas).
(f) Reset and start timer.
(3) Go to step (1).

Figure 16:
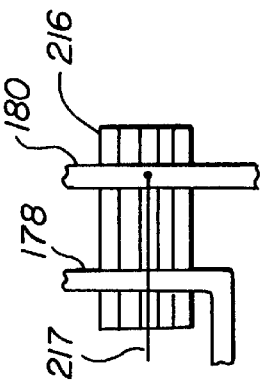
FIG. 16 is a diagrammatic view of a modification to the fourth embodiment of the control apparatus of FIG. 15.

As shown in FIG. 16, a heat exchanger 216 should be used. in high temperature environments to cool the barrier liquid (or gas) if the electronic components of the detection and measurement arrangement 194 are located nearby. An additional temperature probe 217 is located on the heat exchanger 216 and connected to temperature transducer 204. The additional temperature measurement is used in the calculations for more accurate results.

Figure 17:
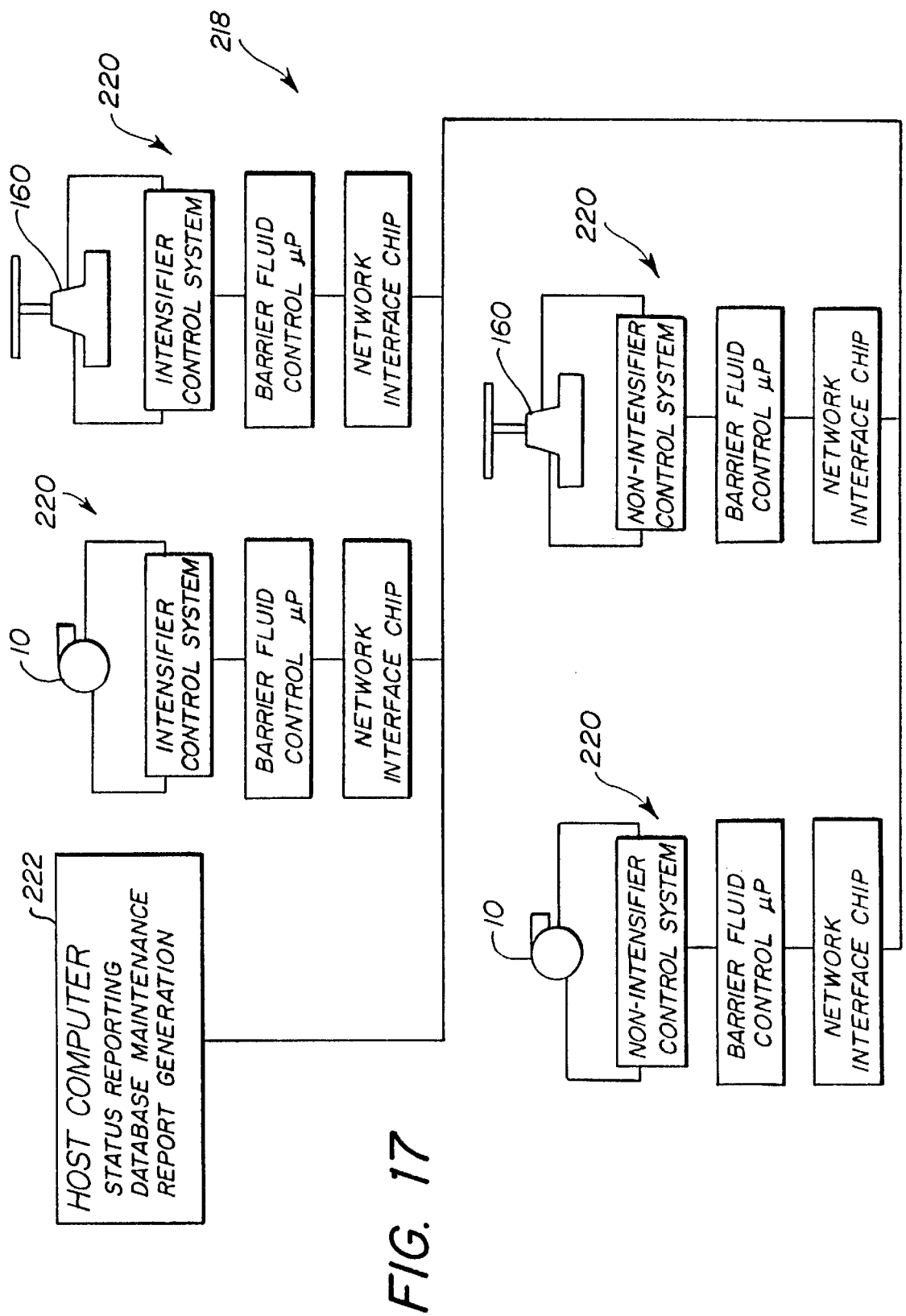
FIG. 17 is a diagrammatic view a reporting network of pumps and valves wherein each employs the dual mechanical seal barrier fluid leakage control apparatus which operates in accordance with the method of the present invention.

Referring to FIG. 17, there is diagrammatically illustrated a combination of pumps 10 and valves 160 with fluid leakage control and measurement apparatuses 54 connected together to form a pump and valve reporting network, generally designated 218. The network 218 can be constructed using several different types of communication media and communication standards. Each pump/valve 220 node has an advanced communication chip that allows a host computer 222 connected to the network 218 to poll each pump/valve node 220 for leakage information. Leakage data from each node 220 is collected by the host computer 222 over the network 218 and entered into a database. Reporting software located on the host computer 222 runs against the database, generating leakage status and maintenance reports for he entire network. Pump/valve reporting networks can include hundreds of nodes spanning entire chemical refinery processing plants.

It should be understood that the electronic components of the pressure monitoring and control arrangement 58 of all four embodiments of the leakage control apparatus 54 disclosed herein have been illustrated in functional block diagram form in view that individually these components have well-known conventional constructions within the understanding of one of ordinary skill in the art. Thus, to describe these components in any greater detail than the functional description given herein would only serve to unduly complicate the description of the parts of the leakage control apparatus 54 and would not serve to foster a better understanding of the dual seal barrier fluid leakage control method of the present invention. A sufficient understanding of the present invention can be gained from the functional description set forth above without describing such details. It should also be understood that other software algorithms are possible, While the four embodiments of the leakage control apparatus 54 disclosed herein have been illustrated in application to a pump 12 and a valve, as mentioned earlier, it should be understood that the apparatus can be employed with a variety of other equipment, such as compressors, turbines, agitators, centrifuges, mixers and generators. The seal barrier fluid leakage control apparatus can be used for any type of dual seal that uses a barrier fluid. For example, it has been suggested that oil and gas wells have a dual seal with barrier fluid to prevent contamination of water-bearing formations. Another example is a dual piping system wherein an inner pipe contains contaminated fluid and an outer pipe contains a barrier fluid between the annulus defined by the pipes. Still another example is a storage tank which has a liner surrounding the tank. The storage tank contains some unsafe fluid and the liner contains the barrier fluid.

It is thought that the present invention and its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

I claim:

1. A method for controlling leakage of barrier fluid from a dual seal assembly of fluid handling equipment, the dual seal assembly having a process fluid chamber containing pressurized process fluid, a barrier fluid chamber containing pressurized barrier fluid and being spaced from the process fluid chamber, a primary seal disposed between the process fluid chamber and barrier fluid chamber and a secondary seal disposed between the barrier fluid chamber and external atmosphere, said method comprising the steps of:

(a) maintaining the pressure of the barrier fluid in the barrier fluid chamber at a preset pressure level above the pressure of the process fluid in the process fluid chamber in response to the absence of barrier fluid leakage from the dual seal assembly;

(b) providing a member capable of movement through a linear displacement in response to and directly proportional to a change in volume of barrier fluid in the barrier fluid chamber;

(c) measuring the linear displacement of said member to calculate the current position of said member;

(d) comparing the calculated current position of said member to maximum and minimum stored positions thereof;

(e) in response to the comparing, providing an indication of whether there is leakage of the barrier fluid from the barrier fluid chamber; and (f) in response to an indication of leakage of the barrier fluid from the barrier fluid chamber, actuating the supplying of barrier fluid to the barrier fluid chamber and calculating a rate of the leakage of the barrier fluid.

2. The method of claim 1 further comprising the step of: providing a readout of the rate of leakage.

3. The method of claim 1 further comprising the step of: displaying a readout of the rate of leakage.

4. The method of claim 1 wherein said rate of leakage includes an average leakage rate.

5. The method of claim 1 wherein said rate of leakage includes an instantaneous rate of leakage.

6. The method of claim 1 further comprising the step of: providing separate readouts of the average leakage rate and the instantaneous leakage rate such that large differences between average and instantaneous leakage rates indicates that the leakage rate is changing.

7. The method of claim 1 further comprising the step of: displaying separate readouts of the average leakage rate and the instantaneous leakage rate such that large differences between average and instantaneously leakage rates indicates that the leakage rate is changing.

8. The method of claim 1 further comprising the step of: sensing the pressure of the barrier fluid and measuring and generating a signal representative of the pressure of the barrier fluid, said signal being provided as an input used in the calculating of the rate of the leakage of the barrier fluid.

9. The method of claim 1 further comprising the step of: sensing the temperature of the barrier fluid and measuring and generating a signal representative of the temperature of the barrier fluid, said signal being provided as an input used in the calculating of the rate of the leakage of the barrier fluid.

10. The method of claim 1 wherein said actuating the supplying of barrier fluid to the barrier fluid chamber is initiated when the calculated current position of said member is greater than or equal to the maximum stored position and is terminated when the calculated current position is less than or equal to the minimum stored position of said member.

11. The method of claim 1 wherein said maintaining of the barrier fluid pressure includes:

connecting first and second opposite end portions of an elongated hollow cylinder of a pressure intensifier mechanism respectively in pressure-sensitive communication with the process fluid chamber and barrier fluid chamber;

reciprocally mounting a piston member in said hollow cylinder having a first end of said piston member in pressure-sensitive communication with the pressurized process fluid at said first end portion of said hollow cylinder and a second end of said piston member in pressure-sensitive communication with the pressurized barrier fluid at said second end portion of said hollow cylinder; and attaching to and extending from said second end of said piston and through said second end portion of said hollow cylinder an elongated rod which constitutes said linearly displaceable member, said first end of said piston member being larger in surface area than said second end thereof, due to the presence of said elongated rod at said second end of said piston, in a predetermined ratio that increases the barrier fluid pressure to and maintains the barrier fluid pressure at the predetermined pressure level above the pressure of the process fluid in response to the absence of barrier fluid leakage from the dual seal assembly.

12. The method of claim 1 further comprising the steps of:

connecting a pressure sensor between the barrier fluid chamber and the second end portion of said hollow cylinder of said pressure intensifier mechanism;

connecting a barrier fluid isolation valve between said pressure sensor and said second end portion of said hollow cylinder of said pressure intensifier mechanism; and operating said isolation valve between an open condition to indicate whether there is leakage of barrier fluid from the barrier fluid chamber and a closed condition to monitor said pressure sensor and to indicate where the leakage is located.

13. The method of claim 11 wherein said attaching of said elongated rod includes protruding an end portion of said rod exteriorly from said second end portion of said hollow cylinder.

14. The method of claim 11 wherein said measuring the linear displacement of said elongated rod includes disposing a linear measurement device adjacent to said protruding end portion of said rod that is adapted to measure the movement and position of said rod and thereby the movement and position of said piston relative to said hollow cylinder and generate an output signal proportional thereto.

15. The method of claim 14 wherein said comparing the calculated current position of said member to maximum and minimum stored positions thereof includes:

storing maximum and minimum positions of said piston correlated to a preset volume of the barrier fluid in said second end portion of said hollow cylinder;

receiving said output signal of said linear measurement device and comparing the calculated current position of said piston as represented by said output signal to said maximum and minimum stored positions thereof; and initiating the supplying of barrier fluid to the barrier fluid chamber of the dual seal assembly in response to the calculated current position being greater than or equal to the maximum position and terminating the supplying of barrier fluid to the barrier fluid chamber of the dual seal assembly in response to the calculated current position being less than the minimum position.

16. The method of claim 15 said calculating the rate of the leakage of the barrier fluid includes:

receiving said output signal from said linear measurement device; and calculating linear displacement, displaced volume of barrier fluid in said hollow cylinder and duration of time of linear displacement so as to calculate therefrom the rate of leakage of the barrier fluid from the barrier fluid chamber.

17. The method of claim 16 wherein said rate of leakage is an average leakage rate.

18. The method of claim 16 wherein said rate of leakage is an instantaneous leakage rate.

19. The method of claim 16 further comprising the step of: providing a readout of the rate of leakage.

20. The method of claim 16 further comprising the step of: displaying a readout of the rate of leakage.

21. The method of claim 16 further comprising the step of:

sensing the pressure of the barrier fluid and measuring and generating a signal representative of the pressure of the barrier fluid, said signal being provided as an input used in said calculating of the rate of the leakage of the barrier fluid.

22. The method of claim 16 further comprising the step of:

sensing the temperature of the barrier fluid and measuring and generating a signal representative of the temperature of the barrier fluid, said signal being provided as an input used in said calculating of the rate of the leakage of the barrier fluid.

23. The method of claim 1 further comprising the step of:

relieving the barrier fluid pressure in response to large changes in the process fluid pressure.

* * * * *